United States Patent [19]
Schneider

[11] 3,839,703
[45] Oct. 1, 1974

[54] ELECTRONIC SELECTOR SYSTEM FOR AUTOMATIC PHOTOGRAPHS

[75] Inventor: Michael Schneider, Chicago, Ill.

[73] Assignee: Rock-Ola Manufacturing Corporation, Chicago, Ill.

[22] Filed: July 9, 1973

[21] Appl. No.: 377,409

[52] U.S. Cl. .......... 340/162, 340/147 R
[51] Int. Cl. .......... G11b 5/00
[58] Field of Search .......... 340/162, 147 R

[56] References Cited

UNITED STATES PATENTS 2,717,781 9/1955 Reykjalin .......... 340/162 X

*Primary Examiner*—Harold I. Pitts
*Attorney, Agent, or Firm*—Davis, McCaleb & Lucas

[57] ABSTRACT

An electronic selector system operable to transmit multi-train pulse signals representative of record selections to an automatic photograph at a remote location. The selector system generally comprises a plurality of selectively operable pushbutton switches representing selection digits, electronic pulse train counters each operable when connected to an electrical pulse generator to count a train of a preset number of pulses and electronic circuitry for presetting the counters in coded correspondence with operation of the pushbuttons. Record selections represented by individually identifiable multi-train pulse signals are each preconditioned upon operational sequencing of the pushbuttons according to predetermined digit combinations.

20 Claims, 19 Drawing Figures

2ND PULSE TRAIN TRANSMISSION

FIG. 14 SYSTEM RESETS

TWO OR MORE PUSHBUTTONS PRESSED OR INCORRECT 3RD DIGIT SELECTED

ELECTRONIC SELECTOR SYSTEM FOR AUTOMATIC PHOTOGRAPHS

BACKGROUND OF THE INVENTION

1. Field of the Invention

This invention relates in general to automatic coin-controlled phonographs, and more particularly to a novel selectively operable control system therefor.

2. Description of the Prior Art

Prior systems known to applicant for controlling an automatic coin-operated phonograph at a remote location, frequently called wall boxes, generally comprise electromechanical transmitters for providing coded pulse signals representative of record selections to control a pulse receiver contained in the phonograph by means of transmitting conductors. See, for example, the transmitting and receiving devices disclosed in U.S. Pat. Nos. 2,909,761 and 3,085,228.

Although such electro-mechanical transmitting devices are quite reliable, need has arisen for an improved wall box control system which is smaller, faster in operation and less expensive to manufacture.

SUMMARY OF THE INVENTION

The present invention is directed to such an improved device, and comprises a reliable electronic control system for automatic phonographs which is smaller, faster and less expensive than its electromechanical predecessors. The present invention comprises a compact electronic circuit, preferably utilizing large scale integrated circuits, which is compatible with previous wall boxes, receivers and phonographs. The selector system of the present invention preferably utilizes digital control pushbuttons as encoder means in which multiple digit combinations are used to identify specific record selections, similar to the digital encoder pushbuttons described in an application filed on Oct. 13, 1972 in the name of Ralph E. Petri having Ser. No. 297,423 and entitled "SELECTOR SYSTEM FOR AUTOMATIC PHONOGRAPHS" which is assigned to the same assignee as the present application.

In general, the present invention comprises novel electronic circuitry operable to transmit multi-train electrical pulse signals representative of record selections to an automatic phonograph having a pulse receiving device. Information identifying a record selection is contained in the coded number of electrical pulses in each pulse train which corresponds to operational sequencing of the control pushbuttons.

The electronic selector system of the present invention generally comprises: a pulse generator in circuit with a voltage source and operable to produce a continuous series of electrical pulses at a predetermined frequency, a plurality of selectively operable pushbuttons for actuating corresponding switches, first and second electronic pulse train counters in circuit with each other, each being operable when connected to the pulse generator to count to a common output a train of a preset number of pulses; circuit means connecting the switches with the first and second counters for individually presetting same to respectively count first and second pulse trains comprising first and second numbers of pulses, the first number of pulses being in coded correspondence with operation of first and second of the pushbuttons, the second number of pulses being in coded correspondence with operation of a third of the pushbuttons; and a step counter in circuit with means for actuating same in response to successive pushbutton operations, the step counter being initially operable to sequentially connect the circuit means to the first and second counters for presetting same, the step counter being subsequently operable to connect the pulse generator to the first and second counters to sequentially count to the output the first and second pulse trains. Record selections represented by individually identifiable multi-train pulse signals are each preconditioned upon predetermined operational sequencing of three of the pushbuttons. The present invention further comprises novel system error detecting means being operable upon erroneous operation of any of the pushbuttons to disable the selector system by preventing further operation of the step counter, reset means also being provided to reinitiate operation of the selector system after such erroneous operation has occurred.

It is an important object of this invention to provide an improved selector system for use with automatic coin-operated phonographs or other controlled mechanisms.

Another important object of this invention is to provide an electronic selector system comprising a compact wall box unit operable to transmit multi-train pulse signals for controlling an automatic phonograph at a remote location.

A still further object of this invention is to provide an electronic selector system which is reliable, small, fast in operation and inexpensive to manufacture.

Still another important object of this invention is to provide an electronic selector system utilizing digital control pushbuttons as encoder means in which multiple digit combinations are used to identify specific record selections by means of individually identifiable multi-train pulse signals.

Yet another object of this invention is to provide an electronic selector system having a system error detecting means operable upon erroneous operation of any of the pushbuttons to disable the selector system.

Numerous other objects and advantages of the invention will be apparent from the following description, which, when taken in conjunction with the accompanying drawings, discloses a preferred embodiment thereof.

DESCRIPTION OF THE PREFERRED EMBODIMENT

Figure 1:
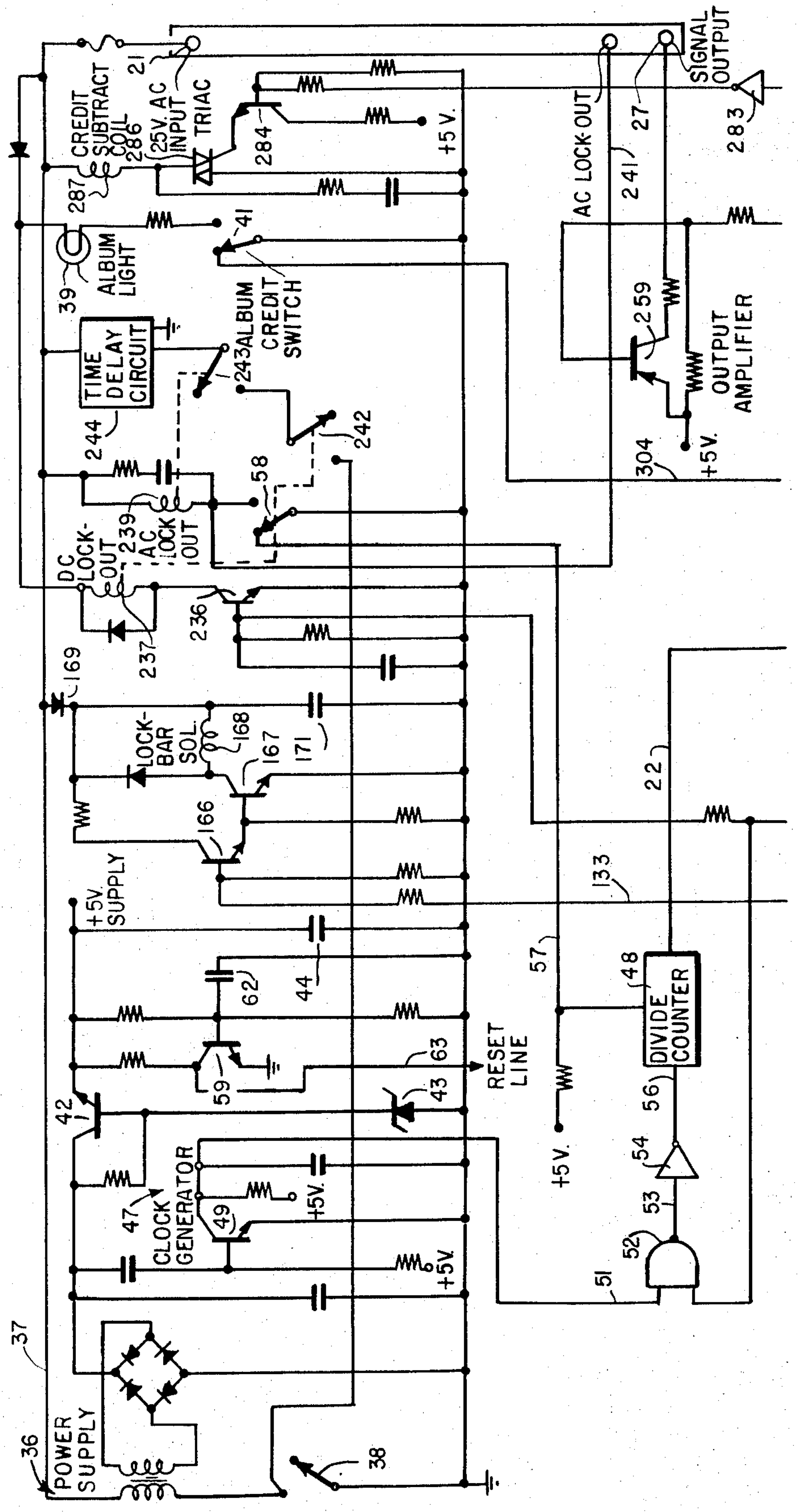
FIGS. 1–3 are schematic diagrams which together illustrate the basic features of the preferred embodiment of the present invention.
Figure 2:
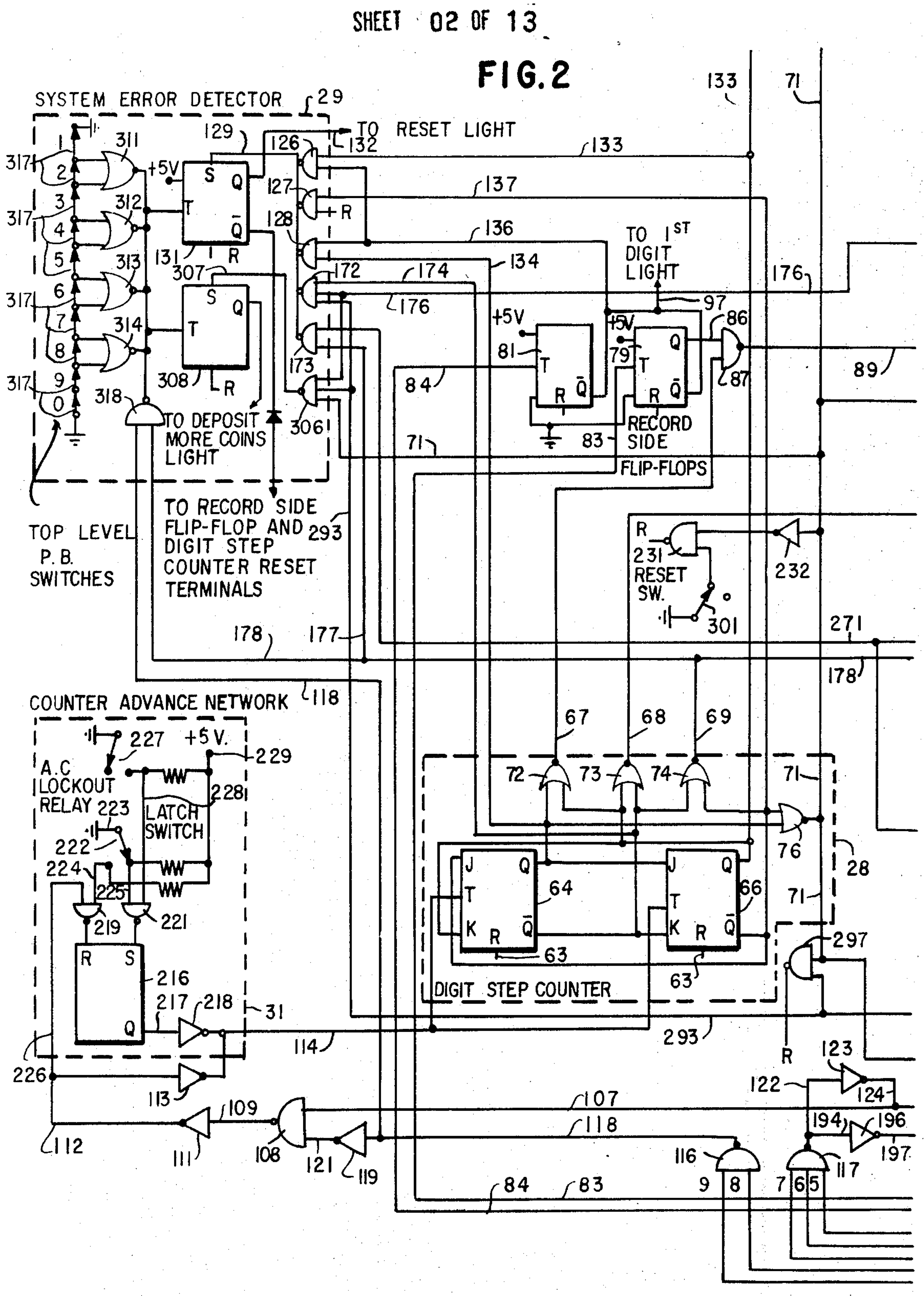
Figure 3:
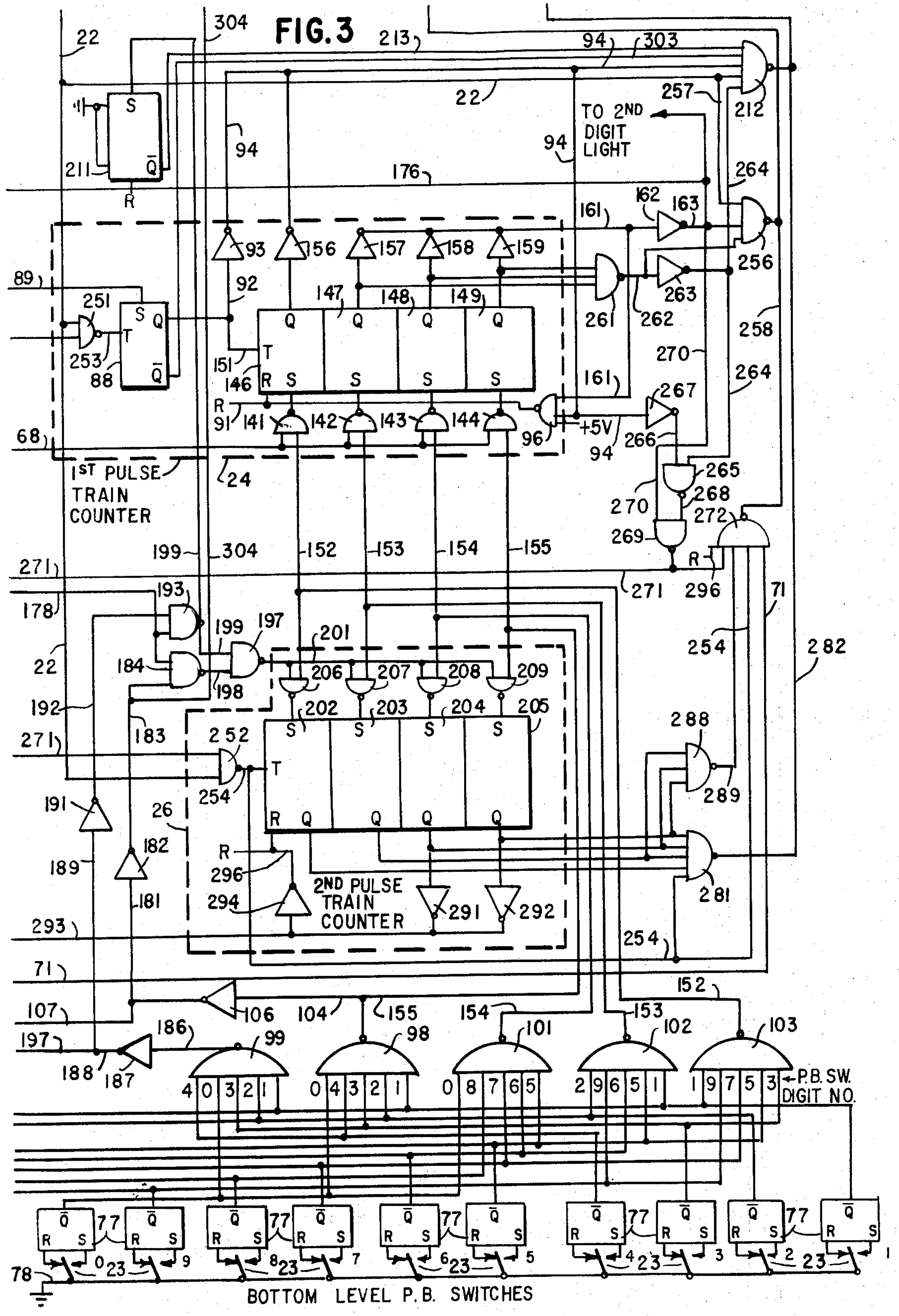

Turning now to the preferred embodiment of the present invention, reference is initially made to FIGS. 1–3 which together schematically illustrate its basic features, certain reset and power supply connections being omitted for simplification. As shown therein, the electronic selector system comprises the following conventional electronic logic elements, which are preferrably contained within large scale integrated circuit packages: inverters, NAND gates, NOR gates and flip-flops or binary bistable memory elements. Throughout the following description, the presence of approximately 5 volts DC represents a 1 logic state or condition, with zero voltage representing a 0 logic state. While the functions of the basic electronic logic elements are well-known and need no detailed explanation, their essential respective functions are briefly summarized here. An inverter is operable to provide at its output the opposite logic state of that at its input. The output of a NAND gate will assume a 0 logic state only if all of its inputs are at a 1 condition. A NOR gate will provide a 1 output only when all of its inputs assume a 0 condition. Finally, the flip-flops contain the conventional set (S), reset (R) clock or trigger (T), J, K, Q and $\overline{Q}$ terminals, negative-going transitions at the trigger terminals being operable to reverse the Q and $\overline{Q}$ output conditions. Application of a 0 condition to a flip-flop reset terminal will change its Q output to a 0 state, while supplying a 0 condition to its set terminal will change its Q output to a 1 state, with corresponding changes in its $\overline{Q}$ output. Conditions on the J and K input terminals control the switching of the flip-flop outputs by changes at their T terminals in a well-known manner.

It should be noted that the voltages and component types and values illustrated in the figures correspond to voltages and components conveniently available and utilized in a typical working embodiment of the present invention, but operation of the electronic selector system is certainly not restricted to the values shown, their selection being merely a matter of design choice. Other suitable electronic gating means may of course be substituted for the inverters, NAND gates and NOR gates used in the preferred embodiment. It should be further noted that certain circuit resistors and capacitors having obvious known functions will not be described, as they are not part of the present invention.

In general, with reference to FIGS. 1–3, the electronic selector system comprises a pulse generator in circuit with a voltage source of approximately 25 volts AC at terminal 21 and operable to produce at an output lead 22 a continuous series of electrical pulses at a predetermined frequency, a plurality of selectively operable control means or pushbuttons for actuating corresponding switches 23 and electronic counting means comprising first and second electronic pulse train counters 24 and 26 in circuit with each other, each being operable when connected to the output lead 22 of the pulse generator to count to a common output at terminal 27 a train of a preset number of pulses. The electronic selector system further comprises circuit means connecting the switches 23 with the first and second counters 24 and 26 for individually presetting same to respectively count first and second pulse trains comprising first and second numbers of pulses, said first number being in coded correspondence with operation of first and second of said pushbuttons, said second number being in coded correspondence with operation of a third of said pushbuttons. A digit step or ring counter 28 is provided in circuit with means for actuating same in response to successive pushbutton operations, the step counter being initially operable to sequentially connect said circuit means to the first and second counters 24 and 26 for presetting same, the step counter being subsequently operable to connect the output of the pulse generator on lead 22 to the first and second counters to sequentially count to the signal output terminal 27 the first and second pulse trains. As will be described in detail later, record selections represented by individually identifiable multi-train pulse signals are each preconditioned upon predetermined operational sequencing of three of the pushbuttons. The signal output terminal 27 is connected to an automatic phonograph at a remote location having a receiving device similar to that disclosed in the previously mentioned U.S. Pat. No. 3,085,228 for controlling same.

As will be more fully described later, the electronic selector system comprises system error detecting means 29 being operable upon erroneous operation of any of the pushbuttons to disable the selector system by preventing further operation of the digit step counter 28; a counter advance network 31 is also provided in circuit with the digit step counter for advancing same.

DETAILED DESCRIPTION

Having outlined some of the major components of the electronic selector system of the present invention, its operation and detailed features will be described with additional reference to FIGS. 4–12 and FIGS. 14–19, which are schematic diagrams illustrating selected portions of the electronic selector system circuit, with portions thereof shown in heavy lines to indicate electrically actuated circuit elements during separate operational sequences.

Coin Deposited

Figure 4:
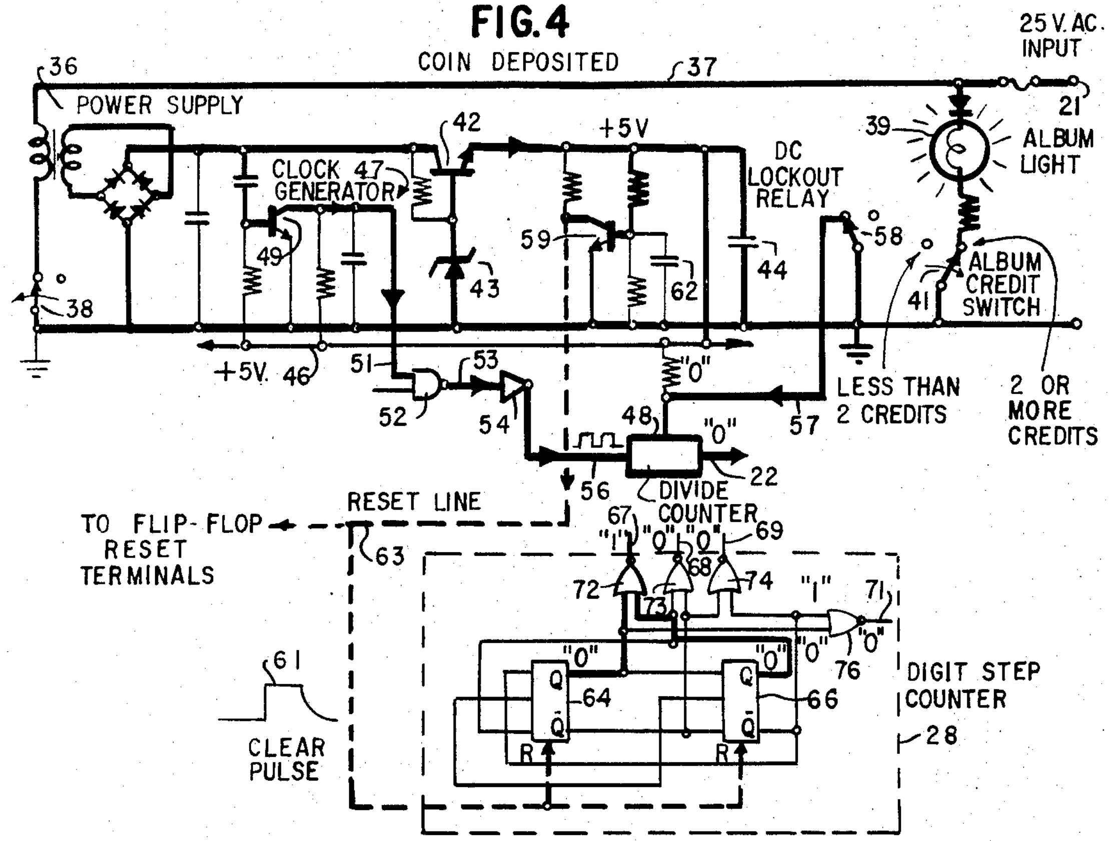
FIGS. 4–12 are additional schematic diagrams illustrating portions of the selector system circuit, with portions thereof shown in heavy lines to indicate electrically actuated circuit elements during operational sequences.

FIG. 4 illustrates the circuit conditions upon the deposit of a coin representing two or more credits into a known accumulator device. As shown therein, electrical energy from terminal 21 supplies a conventional full-wave bridge rectifier DC power supply illustrated at 36 over a lead 37 when a credit switch 38 is closed by operation of the accumulator. An album light 39 is energized when an album credit switch 41 is closed upon registration of two or more credits, two credits being required for an album selection with only one required for a single record play. The power supply 36 comprises a transistor 42, a Zener diode 43 and a filter capacitor 44 operable to provide a regulated 5 volt DC supply on a lead 46 which in turn is connected to selector system flip-flops and other circuit components.

A pulse generator comprising a clock generator 47 and a divide counter 48 and associated circuitry is provided in circuit with the power supply 36 and is operable to produce a continuous series of electrical pulses on lead 22 at a predetermined frequency. The clock generator 47 comprises a transistor 49 in a circuit operable to produce on lead 51 a continuous series of square wave pulses at the line frequency, lead 51 being connected to the divide counter 48 by means of NAND gate 52, lead 53, inverter 54 and lead 56. The divide counter 48 comprises a conventional counter operable to provide electrical pulses having a desirable duration of approximately 50 milliseconds. The divide counter 48 also comprises internal gating means in circuit with a hold terminal connected to lead 57 which, when grounded by the closed DC lockout relay switch 58, clamps the output on lead 22 to a hold or 0 condition.

The selector system further includes means for supplying a clear or reset pulse to flip-flop reset terminals throughout the selector system to insure that the system starts from a standby or zero condition; transistor 59 is provided in conjunction with a circuit operable to produce a pulse illustrated at 61 on the reset line connected to the system flip-flops, capacitor 62 gradually charging to terminate the clear pulse. The connections between the output of the clear circuit on leads 63 and all of the flip-flop reset terminals are not shown for the purpose of simplifying the drawings.

Lead 63 is connected to the reset terminals of flip-flops 64 and 66 of digit step counter 28, the clear pulse being operable to set the Q outputs of flip-flops 64 and 66 to a 0 condition. The digit step counter 28 comprises four sequentially energized outputs 67, 68, 69 and 71 respectively connected to NOR gates 72, 73, 74 and 76. Since both inputs of NOR gate 72 are now at a 0 state, the first output 67 assumes a 1 condition. Conventional connections to the J and K terminals of flip-flops 64 and 66 are also provided in a well-known manner, further explanation thereof being unnecessary for an understanding of the present invention. The first pulse train counter 24 is now ready to be preset in coded correspondence with operation of a first digit pushbutton.

First Digit Pushbutton Pressed

Each of the pushbutton actuated switches 23 shown in FIG. 3 normally connects the reset terminal of a corresponding flip-flop 77 to a ground lead 78, thereby providing a 1 condition at the $\overline{Q}$ output thereof. Each switch 23 and its corresponding flip-flop 77 is identified by a numerical digit shown in that figure. In order to illustrate the operation of the electronic selector system, the electronic selection of the record play corresponding to the three digit number 143 will be described.

Figure 5:
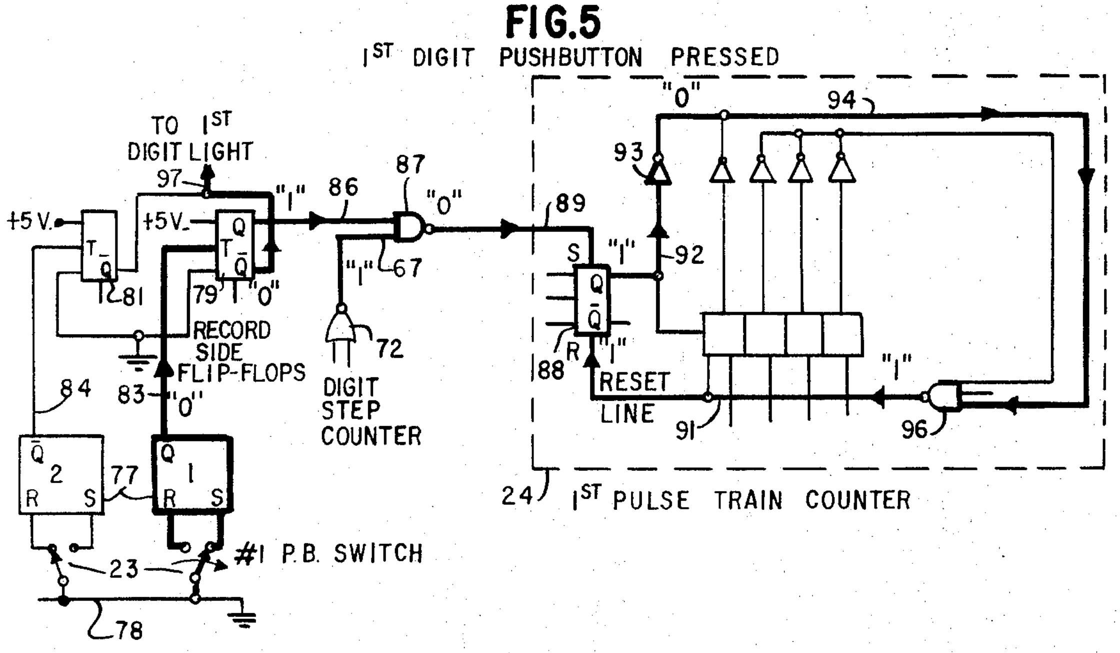

FIG. 5 illustrates the circuit conditions upon depression of the first digit pushbutton corresponding to the numeral 1. According to the code utilized by the electronic selector system, the first digit of the three digit sequence of pushbutton depressions determines the side of the record to be played, the pushbutton corresponding to the numeral 1 selecting the top side of a record selection, with the pushbutton corresponding to the numeral 2 selecting the bottom side. As will be described in detail later, depression of a first digit pushbutton corresponding to a numeral other than 1 or 2 will actuate the system error detector to disable the selector system, thereby requiring the system to be reset in order to reinitiate a proper record selection.

Flip-flops 77 corresponding to numerals 1 and 2 are connected to record side flip-flops 79 and 81 by means of leads 83 and 84 respectively. When the switch 23 corresponding to numeral 1 is depressed, its corresponding flip-flop 77 provides on lead 83 a 0 output to trigger record side flip-flop 79 which produces at its own output on lead 86 a 1 condition. Lead 86 is connected to one input of NAND gate 87 having another input thereof comprising lead 67 which is the first output 72 of the digit step counter 28, lead 67 having been set to a 1 state upon coin deposit as noted earlier. The output of NAND gate 87 is in turn connected to the set terminal of flip-flop 88 of the first pulse train counter 24 by means of a lead 89. The 0 output on lead 89 sets flip-flop 88 into a 1 condition which is then stored in the first pulse train counter by shifting the reset line 91 to a 1 state by means of lead 92, inverter 93, lead 94 and NAND gate 96. Thus, flip-flop 88 of the first pulse train counter 24 is set to a 1 state which is the code representing the top side of a record. Closing the switch 23 corresponding to the numeral 2 similarly triggers flip-flop 81 which is ineffective to trigger flip-flop 88, flip-flop 88 remaining in a 0 state which represents the code for playing the bottom side of a record. When either flip-flop 79 or 81 is actuated, its $\overline{Q}$ output is set to a 0 state in order to activate circuitry to energize a first digit light (not shown) by means of lead 97. It is seen that energization of the first output 67 of digit step counter 28 actuates NAND gate 87 to enable circuit means (comprising flip-flops 77, record side flop-flops 79 and 81 and associated electrical connections) to preset the first pulse train counter in coded correspondence with operation of a first digit pushbutton.

First Digit Pushbutton Returns

Figure 6:
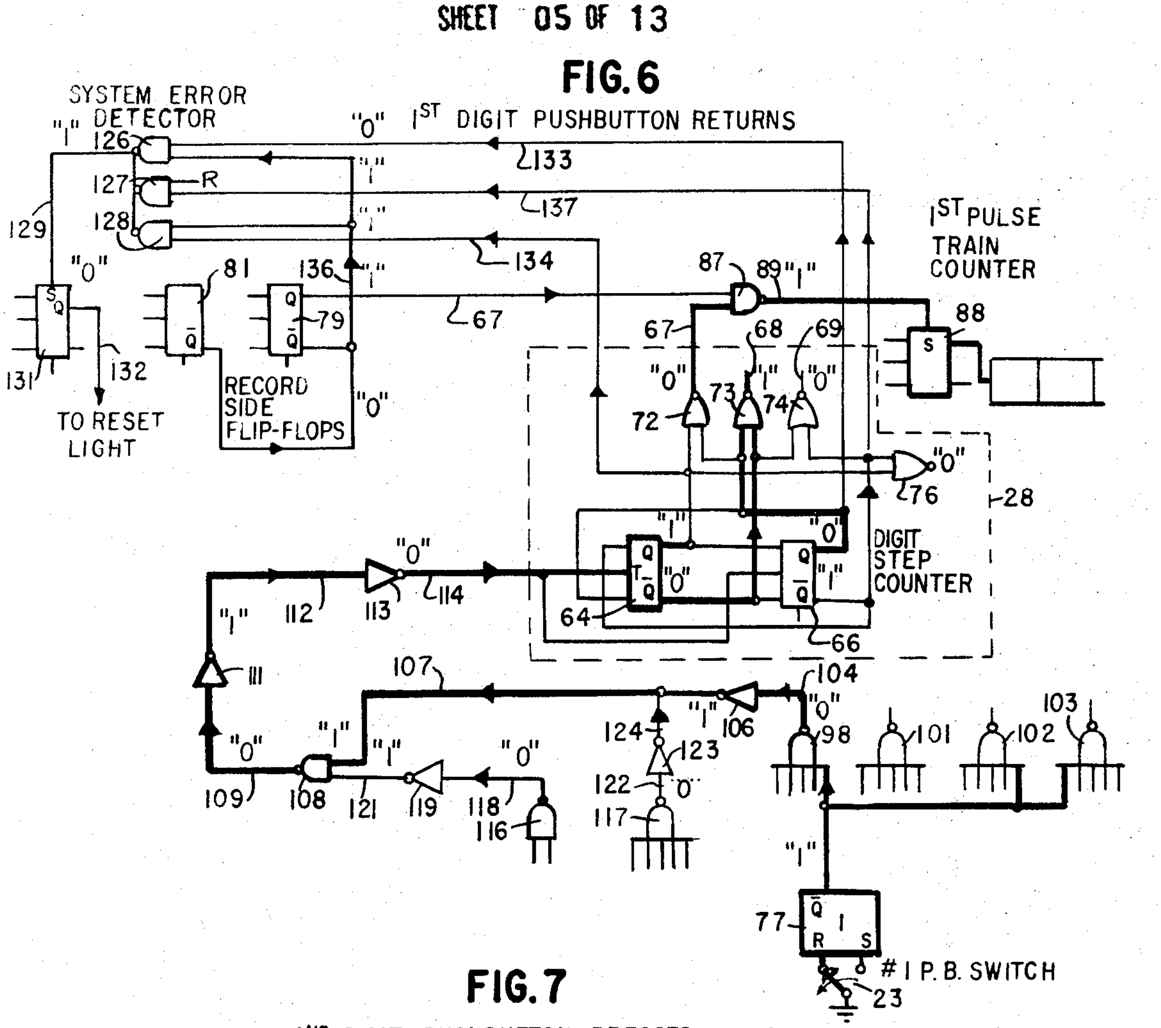

FIG. 6 illustrates the circuit conditions upon release of the first digit pushbutton. As shown therein, the digit step counter is in circuit with means for energizing the second output 68 thereof upon release of the first digit pushbutton.

When the first digit pushbutton returns to its normal position, the $\overline{Q}$ output of its corresponding flip-flop 77 returns to a 1 state which is applied to one of the inputs of NAND gate 98, the other inputs thereof being connected to flip-flops corresponding to other switches 23, as shown in FIG. 3. Other NAND gates 99, 101, 102 and 103 have inputs connected to the outputs of flip-flops 77 corresponding to predetermined numerical digits according to a code, the pushbutton switch digit numbers being denoted in FIG. 3 adjacent to those flip-flop inputs. The output of NAND gate 98 on lead 104 is connected through inverter 106, lead 107, NAND gate 108, lead 109, inverter 111, lead 112, inverter 113 and lead 114 to the clock or trigger input terminal of flip-flop 64 of the digit step counter 28. The change on line 114 from a previous 1 condition to a 0 state toggles flip-flop 64, setting its Q output to a 1 condition and its $\overline{Q}$ output to a 0 condition with the result that both inputs to NOR gate 73 are at a 0 state, thereby causing the output on lead 68 to assume a 1 condition, lead 67 returning to a 0 condition. The 1 state output is therefore transferred from lead 67 to lead 68 upon return of the first digit pushbutton.

As shown in FIGS. 2, 3 and 6, the selector system further comprises NAND gates 116 and 117 in circuit with flip-flops 77 corresponding to the indicated digit numbers. The NAND gate 116 is connected to NAND gate 108 by means of lead 118, inverter 119 and lead 121; since both inputs to NAND gate 116 were in a 1 state when the first digit pushbutton corresponding to the numeral 1 was pressed, the output of NAND gate 116 on lead 118 was a 0 condition with the result that the input to NAND gate 108 on lead 121 was at a 1 state, thereby allowing the 1 state on lead 107 to provide a 0 state on lead 109. The NAND gate 117 is connected to lead 107 by means of lead 122, NAND gate 123 and lead 124; since lead 122 was similarly at a 0 state, the output on lead 124 was a 1 condition with the result that the 1 state on lead 107 produced upon release of the first digit pushbutton was not affected. It will be noted that when inconsistent outputs of inverters are connected to a common terminal, the 0 condition will predominate.

FIG. 6 further illustrates that portion of the system error detector 29 which is operable, as will be described in detail later, to disable the selector system upon erroneous pushbutton operations. The system error detector comprises NAND gates 126, 127 and 128 having a common output on lead 129 which is connected to the set terminal of a flip-flop 131, a 1 condition on line 129 serving to maintain a normal 0 condition at the Q output of flip-flop 131 on lead 132. Lead 132 is connected to circuitry operable to actuate a reset light (not shown) when lead 132 is at a 1 state. As explained later, the $\overline{Q}$ output of flip-flop 131 is operable to disable the electronic selector system when it assumes a 0 condition in response to a 0 condition on line 129. The NAND gates 126 and 128 are respectively connected to the Q outputs of flip-flops 66 and 64 of the digit step counter 28 by means of leads 133 and 134. These NAND gates are also connected to the common $\overline{Q}$ outputs of record side flip-flops 79 and 81 by means of lead 136. NAND gate 127 is connected to the $\overline{Q}$ output of flip-flop 66 by means of lead 137, the other input thereof being connected to a reset line. Since none of the NAND gates 126, 127 and 128 have both inputs thereof at a 1 condition, the common output on lead 129 remains in a 1 state, which represents proper system operation. The first pulse train counter is now ready to be preset in coded correspondence with operation of a second digit pushbutton.

Second Digit Pushbutton Pressed

Figure 7:
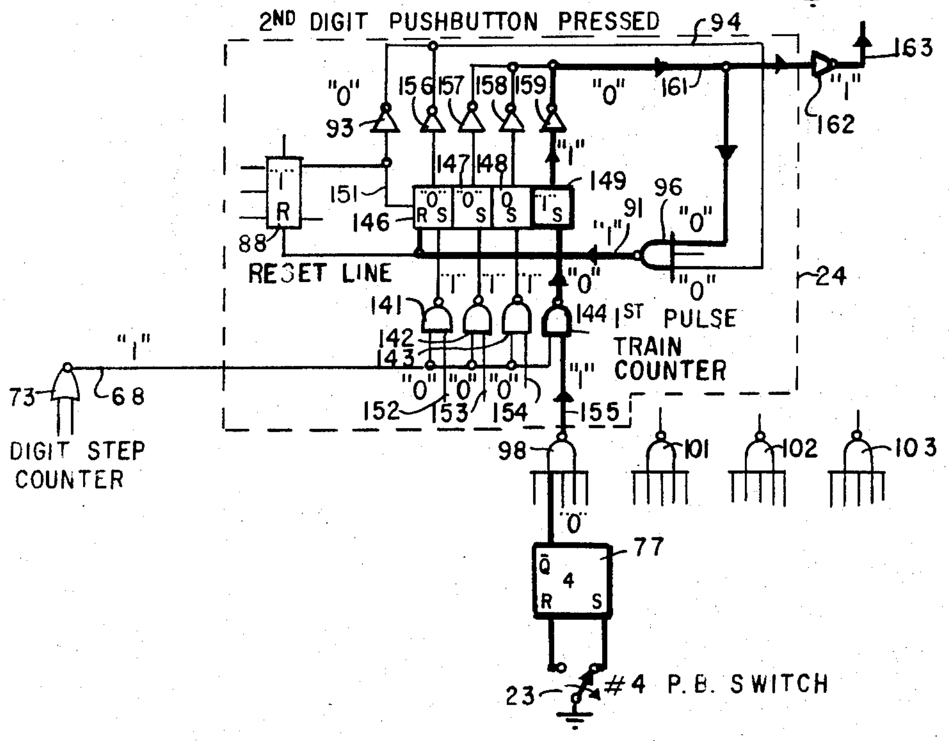

FIG. 7 illustrates the circuit conditions upon depression of the second digit pushbutton corresponding to the numeral 4, which momentarily grounds the set terminal of its corresponding flip-flop 77. It will be remembered that release of the first digit pushbutton transferred the 1 condition from the first output 67 of the digit step counter 28 to the second output 68 thereof. This transfer actuates gating means to enable circuit means to preset the first pulse train counter 24 in coded correspondence with operation of the second of three pushbuttons for a particular record selection. Lead 68 is connected to one input of each of four NAND gates 141, 142, 143 and 144 of the first pulse train counter 24, the outputs thereof being respectively connected to the set terminals of flip-flops 146, 147, 148 and 149 which are connected with flip-flop 88 by means of a lead 151 to comprise a binary ripple counter. With additional reference to FIG. 3, the other input of the NAND gates 141, 142, 143 and 144 are respectively connected to the outputs of NAND gates 103, 102, 101 and 98 by means of leads 152, 153, 154 and 155, these leads also being connected to inputs of NAND gates at the second pulse train counter 26. As noted earlier, NAND gates 98, 101, 102 and 103 are connected to the outputs of flip-flops 77 corresponding to predetermined numerical digits according to a code. Pressing one of the second digit pushbuttons will serve to actuate its corresponding flip-flop 77 to provide at its $\overline{Q}$ output a 0 condition which, when applied to the NAND gates associated therewith, will appear as a 1 condition on one or more of the leads 152, 153, 154 and 155. As shown in FIG. 7, depression of the second digit pushbutton corresponding to the number 4 provides a 0 condition on one of the inputs to NAND gate 98, thereby causing its outputs to become a 1 condition (all of the other inputs of NAND gate 98 being at a 1 state). The result is that the 1 condition on lead 68 from the digit step counter 28 enables the 1 condition on lead 155 to provide, by means of NAND gate 144, a 0 input to preset flip-flop 149 of the first pulse train counter 24. It will be noted that when any other output of the digit step counter 28 is energized, pressing one of the pushbuttons will be ineffective to preset the first pulse train counter. It is seen that the digit step counter 28 is operable to actuate NAND gates 141, 142, 143 and 144 to enable circuit means (comprising flip-flops 77, NAND gates 98, 101, 102 and 103 and associated electrical connections) to preset the first pulse train counter 24 in coded correspondence with second digit pushbutton operations, the code essentially residing in the connections between the inputs of NAND gates 98, 101, 102 and 103 to certain of the numerically coded pushbutton actuated flip-flops 77. It will be appreciated that a variety of unique codes may be utilized to preset the pulse train counters 24 and 26 in accordance with pushbutton operations, the selection of a code being a matter of design choice.

The first pulse train counter further comprises inverters 156, 157, 158 and 159, the outputs of inverters 157, 158 and 159 being connected to a common lead 161 which is one of the inputs to NAND gate 96. The output of inverter 156 is connected to lead 94 which is also the output of inverter 93, lead 94 providing another input to NAND gate 96. When the output of flip-flop 149 is set into a 1 state, inverter 159 provides a 0 input to NAND gate 96, which provides a 1 condition on reset line 91 which is connected to the reset terminals of all of the flip-flops in the first pulse train counter 24 (internal reset connections for flip-flops 147, 148 and 149 not being illustrated). The 1 condition of flip-flop 149 is thereby stored by operation of the reset line. Since the NAND gates 146, 147 and 148 were not set by operation of the pushbutton switch corresponding to numeral number 4, they remain in a 0 state. It is seen that the first pulse train counter has now been preset to count a first pulse train having a first number of pulses in accordance with the stored code 1-0-0-0-1 corresponding to operation of first and second digit pushbuttons for numerals 1 and 4. Lead 161 is further connected to the input of NAND gate 162 having an output on lead 163 which is connected to circuitry for energizing a second digit light (not shown).

Second Digit Pushbutton Returns

Figures 8, 9:
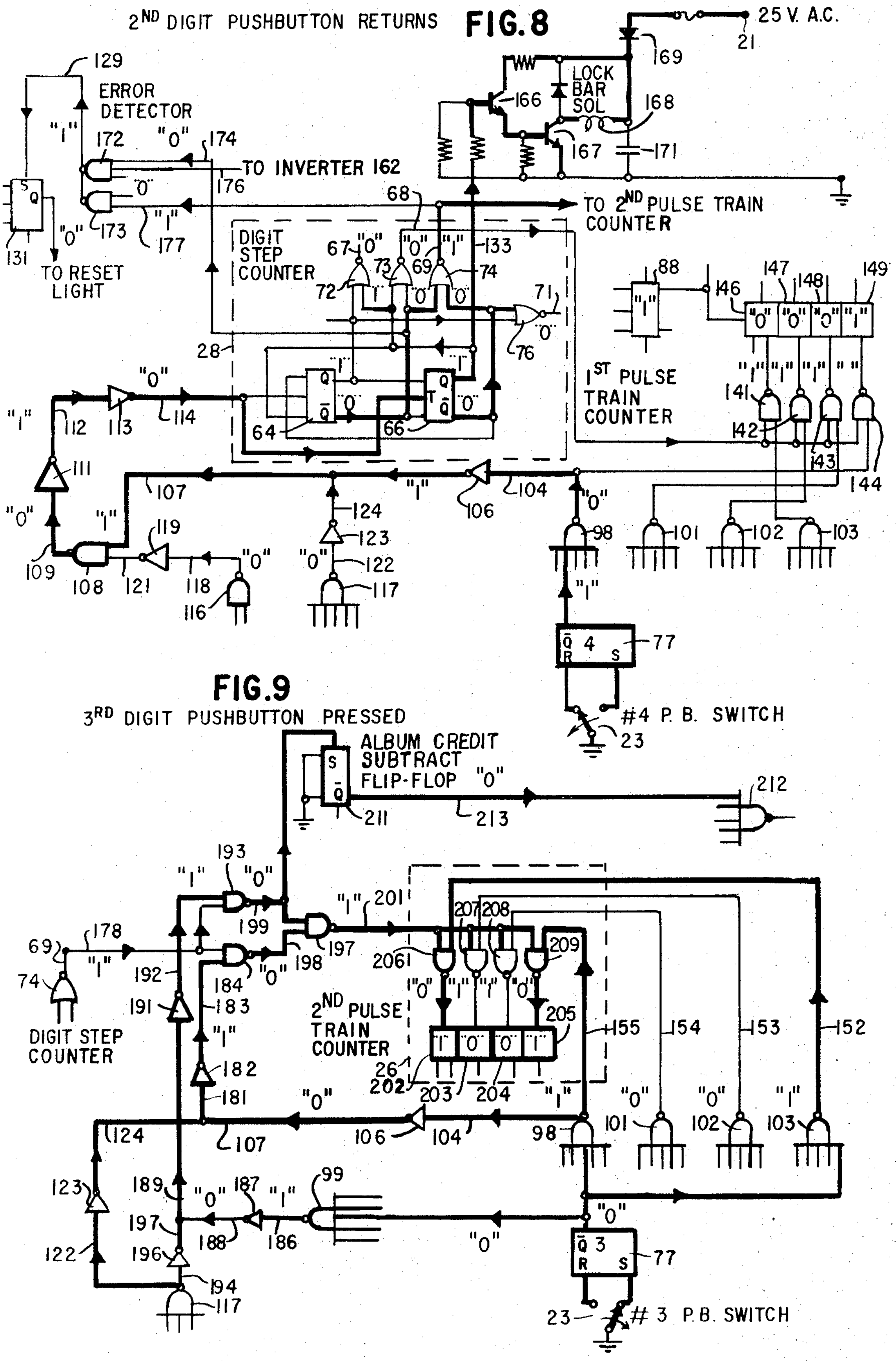

FIG. 8 illustrates the circuit conditions upon release of the second digit pushbutton corresponding to the numeral 4. The effect of the release of the second digit pushbutton is to transfer the 1 condition on the second output 68 of the digit step counter 28 to the third output 69 thereof, in order to enable circuit means to preset the second pulse train counter 26 in response to depression of a third digit pushbutton.

As shown in FIG. 8, release of the pushbutton switch 23 corresponding to the numeral 4 provides a 1 condition at the $\overline{Q}$ output of its corresponding flip-flop 77, which is one of the inputs to NAND gate 98. Since all of the other inputs to NAND gate 98 are at a 1 condition, lead 104 at its output assumes a logical 0 state which, when applied through inverter 106, lead 107, NAND gate 108, lead 109, inverter 111, lead 112 and inverter 113, becomes a 0 condition on lead 114 which serves to actuate the digit step counter 28 in a manner similar to that illustrated in FIG. 6 for the return of the first digit pushbutton. The negative-going change on lead 114 toggles flip-flop 66 of the digit step counter 28 which provides a 0 condition on each of the two inputs to NOR gate 74 in order to produce a 1 condition on its output lead 69.

The Q output of flip-flop 66 is connected by means of lead 133 to the base of a normally non-conductive transistor 166, thereby causing it to conduct in order to turn on another non-conductive transistor 167 having a lock-bar solenoid 168 in its collector circuit, thereby energizing the lock-bar solenoid from the power input at terminal 21 through a diode 169 in circuit with a filter capacitor 171. The preferred embodiment of the present invention comprises a mechanical lock-bar system (not shown) which is employed to positively lock a selected third digit pushbutton in its depressed state and also to mechanically prevent depression of additional pushbuttons until the transmission of the multi-train pulse signals has been completed. The lock-bar solenoid system is described in detail in the previously mentioned copending application having Ser. No. 297,423. Briefly, however, once the lock-bar solenoid is energized, a subsequent pushbutton depression serves to translate a movable lock-bar to prevent release of the third digit pushbutton and subsequent pushbutton operations. Although any one pushbutton may be depressed to select the third digit, once it is depressed, it is locked in its depressed condition until released upon deenergization of the lock-bar solenoid. The operation of the lock-bar system serves to indicate to the phonograph operator that the pushbutton operational sequence for a record selection has been completed.

As shown in FIG. 8, the system error detector further comprises NAND gates 172 and 173 having outputs connected to lead 129. With additional reference to FIGS. 2 and 3, NAND gate 172 is connected to the $\overline{Q}$ output of flip-flop 64 by means of a lead 174, and to the output of inverter 162 by means of a lead 176. The NAND gate 173 has one input thereof connected by means of a lead 177 to the third output 74 of the digit step counter 28, the other input of NAND gate 173 being connected to the second pulse train counter 26. Since no system errors have occurred and, therefore, neither of the NAND gates 172 nor 173 have both inputs thereof in a 1 condition, the error detector 29 is inoperable to disable the electronic selector system.

The third output 69 of the digit step counter 28 is connected to the second pulse train counter 26 by means of a lead 178. The second pulse train counter 26 is now ready to be preset in coded correspondence with operation of a third digit pushbutton.

Third Digit Pushbutton Pressed

FIG. 9 illustrates the circuit conditions upon depression of the third digit pushbutton which, as noted earlier, corresponds to the numeral 3 in the illustrated case. Since only the third output 69 of the digit step counter 28 is now energized, operation of any of the switches 23 will be ineffective to further affect the code stored first pulse train counter 24.

As shown in FIG. 9, depression of the third digit pushbutton corresponding to the numeral 3 presets the second pulse train generator according to a predetermined code. Closing the switch 23 corresponding to the numeral 3 provides at the output of its flip-flop 77 a 0 condition which is applied to one input to each of NAND gates 99, 98 and 103, thereby changing their respective outputs to a 1 condition, all of their other inputs being at a 1 state at this time. The output of NAND gate 98 on lead 104 is applied through inverter 106, lead 107, lead 181, inverter 182 and lead 183 to one input of NAND gate 184 having another input thereof connected to the third output 69 of the digit step counter 28 by means of lead 178. The output of NAND gate 99 is connected by means of a lead 186, inverter 187, a lead 188, a lead 189, inverter 191 and lead 192 to one input of NAND gate 193 similarly having one input thereof connected to the third output 69 of the digit step counter 28. NAND gate 117 is connected to lead 189 by means of lead 194, inverter 196 and lead 197. The outputs of NAND gates 184 and 193 are respectively connected to the inputs of NAND gate 197 by means of leads 198 and 199 to provide, at the output of NAND gate 197 on lead 201, a 1 condition to enable NAND gates 98 and 103 to preset the flip-flops of the second pulse train counter 26.

The second pulse train counter 26 comprises four flip-flops 202, 203, 204 and 205 connected as a binary ripple counter having respective set terminals thereof connected to the outputs of NAND gates 206, 207, 208 and 209. The NAND gates 103, 102, 101 and 98 are respectively connected to one of the inputs of NAND gates 206, 207, 208 and 209 by means of leads 152, 153, 154 and 155. Depression of the third digit pushbutton provides a 1 condition on lead 201 which enables NAND gates 98 and 103 to provide a 0 condition to the set terminal of respective flip-flops 202 and 205 for presetting same. The code of 1-0-0-1 is now stored in the second pulse train counter 26. It is apparent that the digit step counter 28, by energization of its third output 69, actuates NAND gates 184, 197, 206, 207, 208 and 209 to enable circuit means (comprising flip-flops 77, NAND gates 98, 101, 102 and 103 and associated electrical connections) to preset the second pulse train counter 26 in coded correspondence with operation of a third digit pushbutton. The digit step counter 28 must now advance one step in order to lock up the stored code and begin the pulse transmission process.

The NAND gate 99 provides for the removal of one credit for a single record selection or, alternately, for the removal of an additional credit corresponding to a record album selection. The output of NAND gate 193 on lead 199 is connected to the set terminal of an album credit subtract flip-flop 211 having a $\overline{Q}$ output thereof connected to one of the inputs of NAND gate 212 by means of lead 213. As will be described in detail later, if the output of NAND gate 99 is set to be at a 0 state for album selections (rather than the illustrated 1 condition), the output of NAND gate 193 on lead 199 will correspondingly be at a 1 condition; the result is that the $\overline{Q}$ output of album credit subtract flip-flop 211 will be a logical 1 signal which, when applied to one input of NAND gate 212, actuates circuitry to provide at the output thereof a signal pulse representative of an extra credit subtraction during the time interval between transmission of the first and second pulse trains. The NAND gate 212 is, however, disabled when one of its inputs is at a 0 state, as shown in FIG. 9 for a single record selection.

Digit Step Counter Advances

Figure 10:
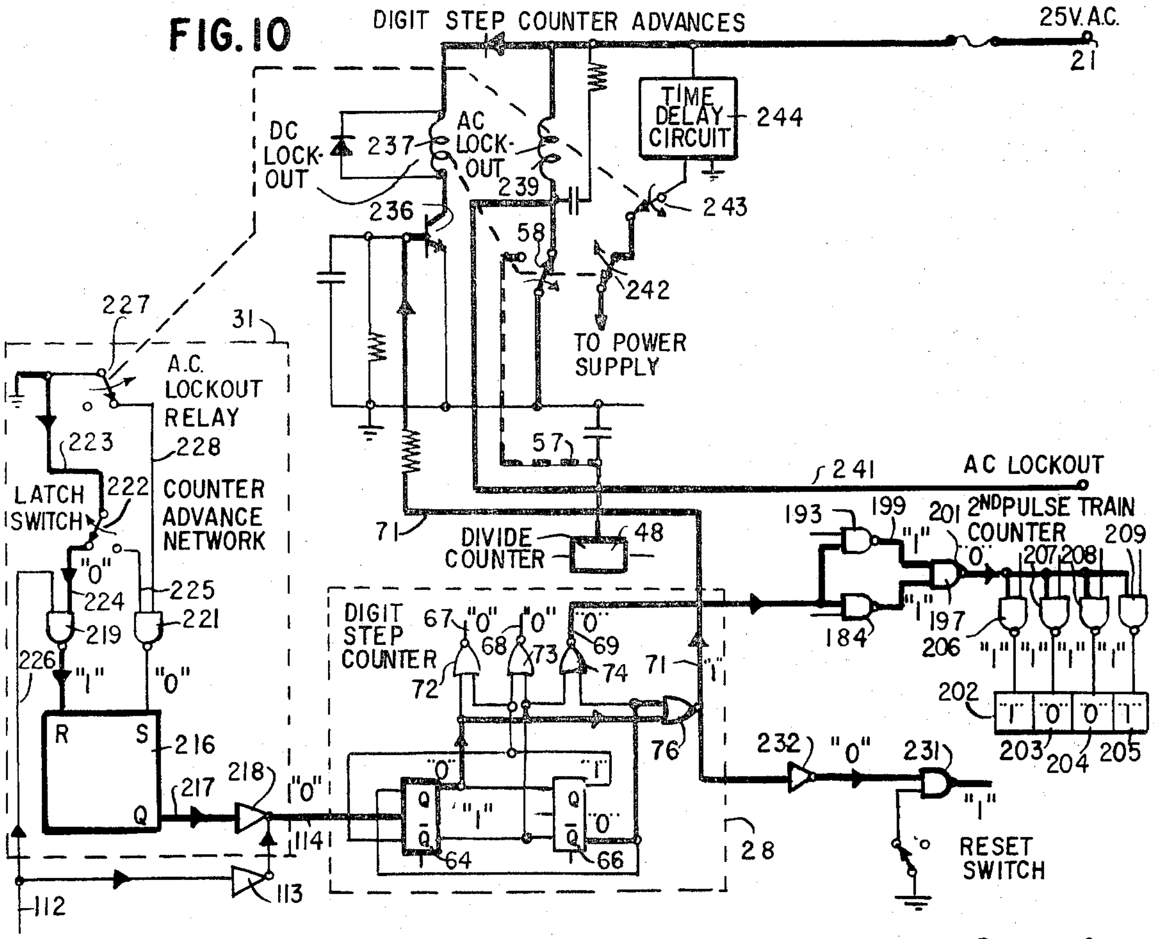

FIG. 10 illustrates the circuit conditions when the 1 state at the third output 69 of the digit step counter 28 advances to the fourth output 71 thereof after the third digit pushbutton has been depressed and locked in that condition by the lock-bar system. The counter advance network 31 actuates the digit step counter 28 to energize its fourth output 71.

As shown in FIG. 10, the counter advance network 31 comprises a flip-flop 216 having a Q output thereof connected to lead 114 by means of a lead 217 and an inverter 218. The reset and set terminals of flip-flop 216 are respectively connected to outputs of NAND gates 219 and 221. The counter advance network 31 comprises a latch switch 222 having an arm connected to a ground lead 223, the latch switch being operable to ground either lead 224 or lead 225, these leads being respectively connected to inputs of NAND gates 219 and 221. The other input of NAND gate 219 is connected to lead 112 by means of a lead 226, while the other input of NAND gate 221 is connected to one terminal of an AC lockout relay switch 227 by means of a lead 228. With additional reference to FIG. 2, which shows the latch switch 222 and the AC lockout relay switch 227 in their normal positions, it will be noted that one of the leads 224 and 225 will assume a 1 state when ungrounded by the latch switch 222 due to the 5 volt DC supply at terminal 229 connected thereto. When the third digit pushbutton is pressed, the latch switch 222 is mechanically transferred from lead 225 to 224, as shown in FIG. 10, thereby applying a 0 condition to one input of NAND gate 219 and a 1 condition to the reset terminal of flip-flop 216; the result is that line 114 is placed into a 0 state to trigger flip-flop 64 of the digit step counter 28. Since both inputs to NOR gate 76 are now at a 0 state, the 1 condition on the third output 69 of the digit step counter 28 is transferred to its fourth output 71. This logical 1 condition on lead 71 is applied to one input of a reset NAND gate 231 by means of an inverter 232. The reset NAND gate 231 is operable, as will appear later, to provide a 0 condition to reset terminals of the flip-flops of the electronic selector system for resetting same. When the fourth output 71 of the digit step counter 28 is energized, however, the reset NAND gate 231 is rendered inoperable.

The 0 condition on the third output 69 of the digit step counter 28 provides a 0 condition on line 201 in circuit with NAND gates 206, 207, 208 and 209 in order to lock up the stored code in the second pulse train counter flip-flops 202, 203, 204 and 205.

The 1 condition on line 71 is also applied to the base of a normally non-conductive transistor 236 which has in its collector lead a DC lockout relay coil 237, the DC lockout relay being energized upon conduction of transistor 236 from the power supply at terminal 21. Energization of the DC lockout relay coil serves to ground, by operation of DC lockout relay switch 58, one terminal of an AC lockout relay coil 239 having another terminal thereof in circuit with the proper supply at terminal 21, thereby energizing the AC lockout relay coil. An AC lockout line 241 is interconnected with similar AC lockout relays in other phonograph selectors to provide a temporary hold circuit for disabling same in order to prevent interference with the operating selector system. When switch 58 transfers, the hold circuit on line 57 to the divide counter 48 is removed. Energization of the DC lockout relay coil 237 and the AC lockout relay coil 239 serves to close switches 242 and 243 which energize the power supply through a grounded time delay circuit 244, this time delay circuit serving to maintain the AC supply to the power supply 36 for a time interval sufficient to insure completion of the multi-train pulse transmission even after the credit switch 38 has been opened upon removal of the last credit.

Energization of the AC lockout relay coil 239 now serves to transfer AC lockout relay switch 227 for grounding input line 228 to NAND gate 221, both inputs 225 and 228 having been in a 1 condition to enable actuation of flip-flop 216 prior to that switch transfer. Since the AC lockout lines 241 of all selector systems are interconnected, prior operation of any other selector system would have already temporarily transferred the AC lockout switch 227, thereby applying a temporary 1 condition to the set terminal of flip-flop 216, with the result that subsequent transfer of the latch switch 222 would have been temporarily ineffective to actuate flip-flop 216 to advance the digit step counter 28, until the previously operating selector system had removed the AC lockout circuit.

Transmission of the First Pulse Train

Figure 11:
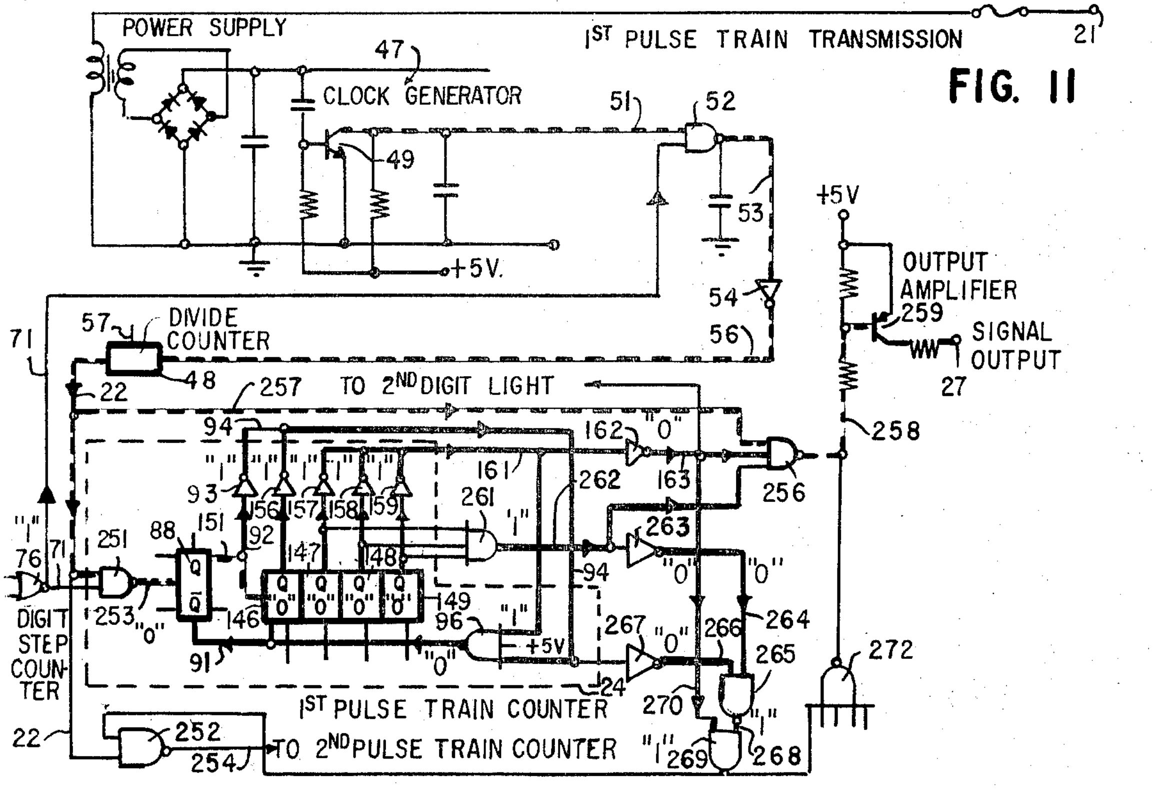

FIG. 11 illustrates the circuit conditions for the transmission of the first pulse train. Additional reference should be made to FIG. 13, which is a pictorial representation of electrical pulse generated at various points in the electronic selector system circuit corresponding to the record selection represented by the pushbutton digits 143. Once the hold circuit on line 57 to the divide counter 48 is removed and certain gating means are actuated by operation of the digit step counter, the pulse generator output on line 22 is connected to the first and second pulse train counters 24 and 26 and the electronic selector system starts to transmit the multi-train pulse signals. The first and second pulse train counters are operable to count to a common output on terminal 27 first and second numbers of pulses which were preset by operation of the pushbuttons, the first number being in coded correspondence with operation of first and second of the pushbuttons, and the second number of pulses being in coded correspondence with operation of a third of the pushbuttons, as previously described.

As shown in FIG. 11, line 22 at the output of the divide counter 48 is connected to NAND gates 251 and 252 having outputs thereof on lines 253 and 254 respectively connected to the clock or trigger terminals of flip-flops 88 and 202 of the first and second pulse train counters 24 and 26. Another input to NAND gate 251 comprises the fourth output 71 of the digit step counter 28. Line 22 is further connected to one input of a NAND gate 256 by means of a lead 257, the output thereof being connected by means of an output lead 258 to an output amplifier circuir having a transistor 259, the collector thereof being in circuit with the common signal output terminal 27. The outputs of flip-flops 147, 148 and 149 are connected to a NAND gate 261 having an output thereof on a line 262 connected to another input of NAND gate 256. Lead 262 is further connected through an inverter 263 and a line 264 to one input of a NAND gate 265 having another input thereof on a lead 266 which is connected to line 94 through an inverter 267. The NAND gate 265 has an output 268 connected to one input of a NAND gate 269 having another input thereof connected to line 163 by means of a lead 270. The output of NAND gate 269 provides a signal on line 271 which serves to enable the second pulse train signals upon completion of the transmission of the first pulse train. Lead 271 is connected to another input of NAND gate 252 and to one input of NAND gate 272 which in turn is connected to the common output lead 258.

It is apparent that energization of the fourth output 71 of the digit step counter 28 serves to actuate gating means (NAND gates 52, 251 and 252, the DC lockout relay coil 237 and associated circuitry and gating means in circuit with the hold terminal of the divide counter 48) to enable the pulse generator to provide pulses to the first and second counters 24 and 26. Electrical pulses produced at the output of the pulse generator on line 22 are connected to the first and second pulse counters 24 and 26 which sequentially count to a common output at terminal 27 first and second pulse trains. It is seen that gating means are provided in circuit with the first and second pulse train counters, said gating means being operable, as described later, to initiate the second train after a predetermined time interval following termination of the first pulse train, this time interval being greater than the time between successive pulses in each of the trains.

Figure 13:
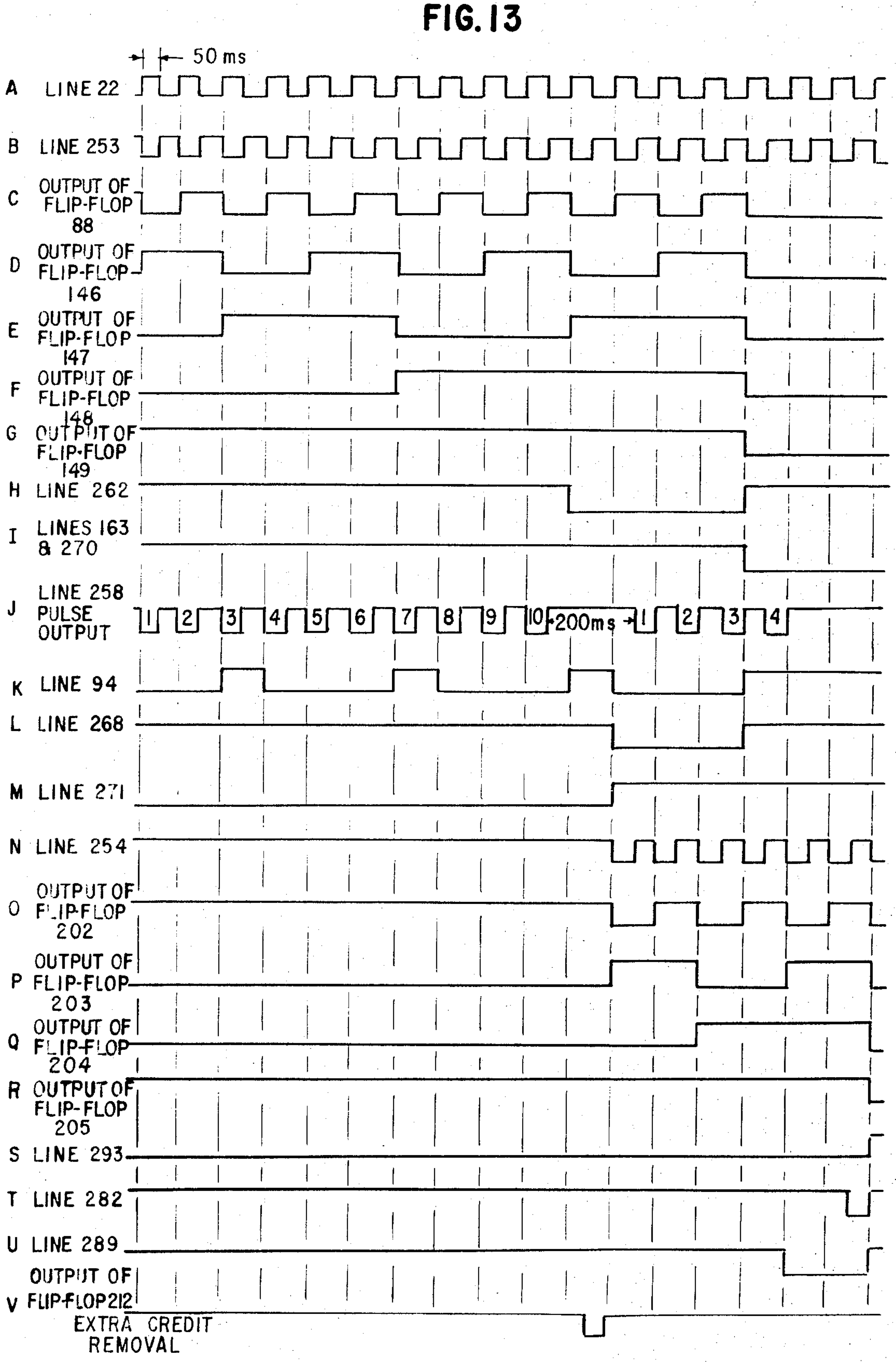
FIG. 13 is a pictorial representation of electrical pulses generated at various points within the selector system circuit.

With additional reference to FIG. 13, a continuous series of electrical pulses each having a duration of approximately 50 milliseconds is provided on line 22, as shown in FIG. 13A, line 22 being connected to one input of NAND gate 256 by means of lead 257. The fourth output on line 71 of the digit step counter 28 provides a logical 1 input to NAND gate 251 having another input thereof connected to line 22, the output of NAND gate 251 on line 253 being illustrated in FIG. 13B. This continuous series of pulses toggles the binary ripple counter comprising flip-flops 88, 146, 147, 148 and 149, negative-going changes at the trigger terminals thereof serving to change their output states. It will be remembered that actuations of the first and second digit pushbuttons corresponding to the numerals 1 and 4 have stored a code of 1-0-0-0-1 in the flip-flops of the first pulse train counter; FIGS. 13C-G illustrate the respective outputs of flip-flops 88, 146, 147, 148 and 149 as they are all toggled to a 0 condition by the pulses on line 253. FIG. 13H illustrates the pulse output on line 262 obtained from NAND gate 261 having inputs connected to the outputs of flip-flops 147, 148 and 149, a signal on line 262 serving to prevent further counting of pulses to the output of NAND gate 256 on line 258. With additional reference to FIG. 13J which represents the pulse output, it is seen that the multi-train pulse signals comprise 0 changes or pulses on an output having a 1 normal condition. In order for the output of NAND gate 256 to have a 0 condition, all of its inputs must have a 1 state, which is impossible after any one of its inputs including line 262 assumes a 0 state. It is also seen that its inputs comprising lines 262 (FIG. 13H) and line 163 (FIG. 13I) are both at a 1 state during transmission of the first pulse train comprising ten pulses (FIG. 13J).

The output pulses from the first pulse train counter 24 are provided by means of lead 258 to the output amplifier transistor 259 and to the signal output terminal 27. When all of the flip-flops are toggled to a 0 condition, as illustrated in FIG. 11, the output of NAND gate 96 provides a 0 pulse to the reset terminals of the flip-flops, thereby holding them in a 0 or stand-by condition.

Gating means are provided for initiating the second pulse train after a desirable predetermined time interval of approximately 200 milliseconds following termination of the first pulse train, this time interval being greater than the time interval between successive pulses in each pulse train of approximate 50 milliseconds. When a 1 state is assumed on line 271, transmission of the second pulse train is enabled. Line 94 (FIG. 13K) in circuit with the output of flip-flops 88 and 146 is connected through inverter 267 to one input of NAND gate 265 having another input thereof connected to line 262 (FIG. 13H) through inverter 263 to provide at its output on line 268 the pulse illustrated in FIG. 13L. Line 268 and line 270 (FIG. 13I) provide inputs to NAND gate 269 having the second pulse train enable signal (FIG. 13M) at its output on line 271.

Second Pulse Train Transmission

Figure 12:
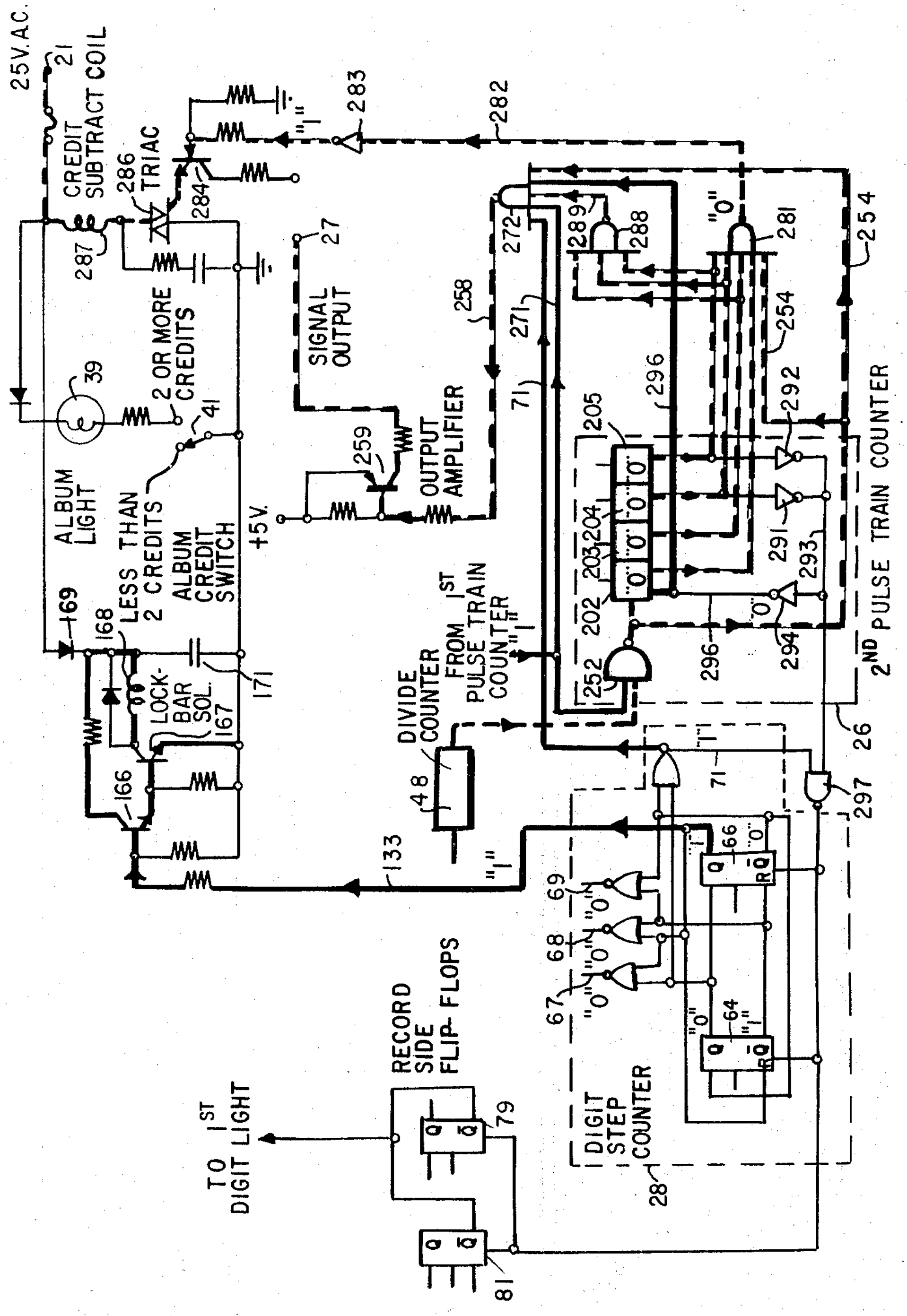

FIG. 12 illustrates the circuit conditions upon transmission of the second pulse train. As shown therein, the 1 condition on line 271 provided by the described gating means in circuit with the first and second pulse train counters 24 and 26 is supplied to one input of NAND gate 252 having another input thereof connected to the output of the pulse generator on line 22, as noted earlier. The output of NAND gate 252 on line 254 is connected to the clock or trigger terminal of the binary ripple counter comprising flip-flops 202, 203, 204 and 205 which have been preset to the code of 1-0-0-1 by operation of the third digit pushbutton corresponding to the numeral 3, as previously described. The Q output terminals of flip-flops 202, 203, 204 and 205 are connected to inputs of a NAND gate 281 having another input thereof connected to line 254 which is also connected to the input of NAND gate 272. The output of NAND gate 281 is connected to a line 282 which in turn is connected by means of an inverter 283 to a circuit comprising a transistor 284 having a triac 286 in its emitter lead, the triac being connected in cricuit with a credit subtract coil 287 in circuit with the voltage input source at terminal 21. A 0 pulse on line 282 serves to operate the transistor 284 and the triac 286 to energize the credit subtract coil 287 to remove one credit from the accumulator in a known manner.

The outputs of flip-flops 203, 204 and 205 are also connected to inputs of a NAND gate 288 having an output thereof in circuit with one input of NAND gate 272 by means of a lead 289. The outputs of flip-flops 204 and 205 are further connected to inverters 291 and 292 having a common output thereof on a line 293. Lead 293 is in turn connected to the common reset terminal of the flip-flops by means of inverter 294 and a line 296 which is also connected to another input of NAND gate 272. Line 293 is further connected to NAND gate 297 having another input thereof comprising the fourth output 71 of the digit step counter 28.

With additional reference to FIG. 13N, it is seen that the output of the pulse generator on line 22 and the second pulse train counter signal on line 271 provide a series of pulses on line 254 connected to the second pulse train counter 26 comprising flip-flops 202, 203, 204 and 205 for triggering same (FIGS. 130-R). It will be remembered that flip-flops 202 and 205 are already in a 1 condition, and flip-flops 203 and 204 are already in a 0 condition. The pulses on line 254 are also connected to one input of NAND gate 272 which provides at output line 258 a second train (four pulses) corresponding to the third pushbutton selection corresponding to the numeral 3, the second pulse train commencing approximately 200 milliseconds after termination of the first pulse train due to the delay in the second pulse train enabling signal on line 271. Since all of the inputs to NAND gate 272 must assume a 1 condition for a 0 output to be obtained on line 258, the output of NAND gate 288 on line 289 serves to terminate or disable further pulse transmission when it assumes a 0 state (FIG. 13U), similar to the output of NAND gate 261 of the first pulse train counter 24. As shown in FIG. 13T, the output of NAND gate 281 on lead 282 will assume a 0 condition for a one pulse interval in order to provide a signal to activate the credit subtract coil which in turn transfers the album credit switch 41 from a position representing two or more credits to a position representing less than two credits, as shown in FIG. 12. It is seen that credit subtract means (essentially comprising NAND gate 281 and associated electrical connections) are provided to supply, upon completion of the second pulse train, a signal pulse representing credit removal.

When the flip-flops in the second pulse train counter 26 are all toggled to a 0 condition, line 293 (FIG. 13S) assumes a 1 condition which in turn provides a 0 state on line 296 for clamping the flip-flops of the second pulse train counter 26 to a standby state.

While the transmission of two pulses trains corresponding to the three digit combination 143 has been described in detail, the first and second pulse train counters 24 and 26 and their associated gating means function in a similar manner for the three digit pushbutton operations representative of other record selections. As noted earlier, the first and second pulse train counters are preset to count first and second numbers or trains of pulses in coded correspondence with pushbutton operations, the code essentially residing in the connections between the inputs to NAND gates 98, 101, 102 and 103 to certain of the numerically coded pushbutton actuated flip-flops 77. In the preferred embodiment of the present invention, the illustrated connections enable the first pulse train counter to be preset to count between 2 and 21 pulses, corresponding respectively to first and second pushbutton sequences of 10 and 29. Similarly, the second pulse train counter is operable to count between 1 and 8 pulses, corresponding respectively to third digit pushbutton selections of 0 and 7. It should be noted that the pulse train code utilized in the preferred embodiment is compatible with codes employed in previous phonograph selector equipment, but operation of the present invention is certainly not restricted to the use of the disclosed code.

System Resets

Figure 14:
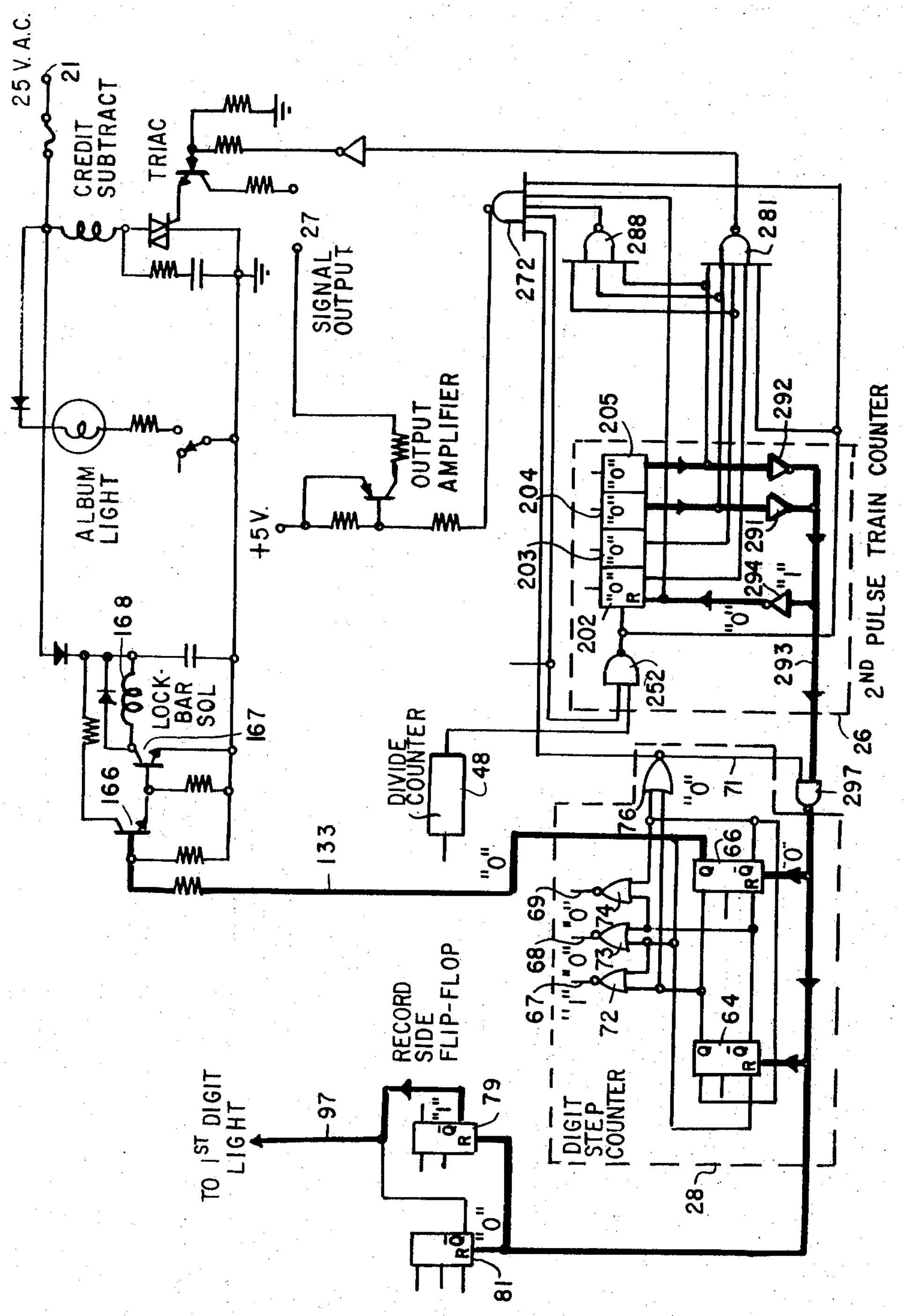
FIGS. 14–19 are additional schematic diagrams illustrating portions of the selector system circuit, with portions thereof shown in heavy lines to indicate electrically actuated circuit elements during operational sequences.

FIG. 14 illustrates the circuit conditions when the electronic selector system resets upon completion of the transmission of the second pulse train. As shown therein, when the flip-flops 202, 203, 204 and 205 of the second pulse train counter 26 are all toggled to a 0 condition, line 293 assumes a 1 state by operation of inverters 291 and 292. The 1 condition on line 293 is applied to the reset terminal of the flip-flop 202 which is internally connected to reset terminals of the other flip-flops in the binary counter, thereby clamping the second pulse train counter 26 in its standby condition. The 1 state on line 293 is applied to one input of the NAND gate 297 having another input thereof comprising the fourth output 71 of the digit step counter 28, line 71 being in a 1 state. The 0 output of NAND gate 297, which is connected to the reset terminals of flip-flops 64 and 66 of the digit step counter 28, resets same to a standby condition. The first output 67 of the digit step counter 28 then assumes a 1 state, as both inputs to NOR gate 72 are now at a 0 condition, thereby preparing the system for acceptance of another single record selection, since one credit remains stored in the accumulator in the illustrated case. However, if no credits are registered in the accumulator, the credit switch 38 will be transferred to an open position, thereby removing power from the selector system until more coins are deposited.

When the flip-flop 66 is reset to its standby condition, line 133, which is connected to the Q output thereof, assumes a 0 state which serves to deenergize the lockbar solenoid 168 by rendering transistors 166 and 167 non-conductive.

The 0 state at the output of NAND gate 297 is applied to the reset terminals of the record side flip-flops 79 and 81, thereby providing a 1 condition on line 97 for actuating circuitry to deenergize the first digit light (not shown).

Erroneous First Digit Pushbutton Pressed

Figures 15, 16:
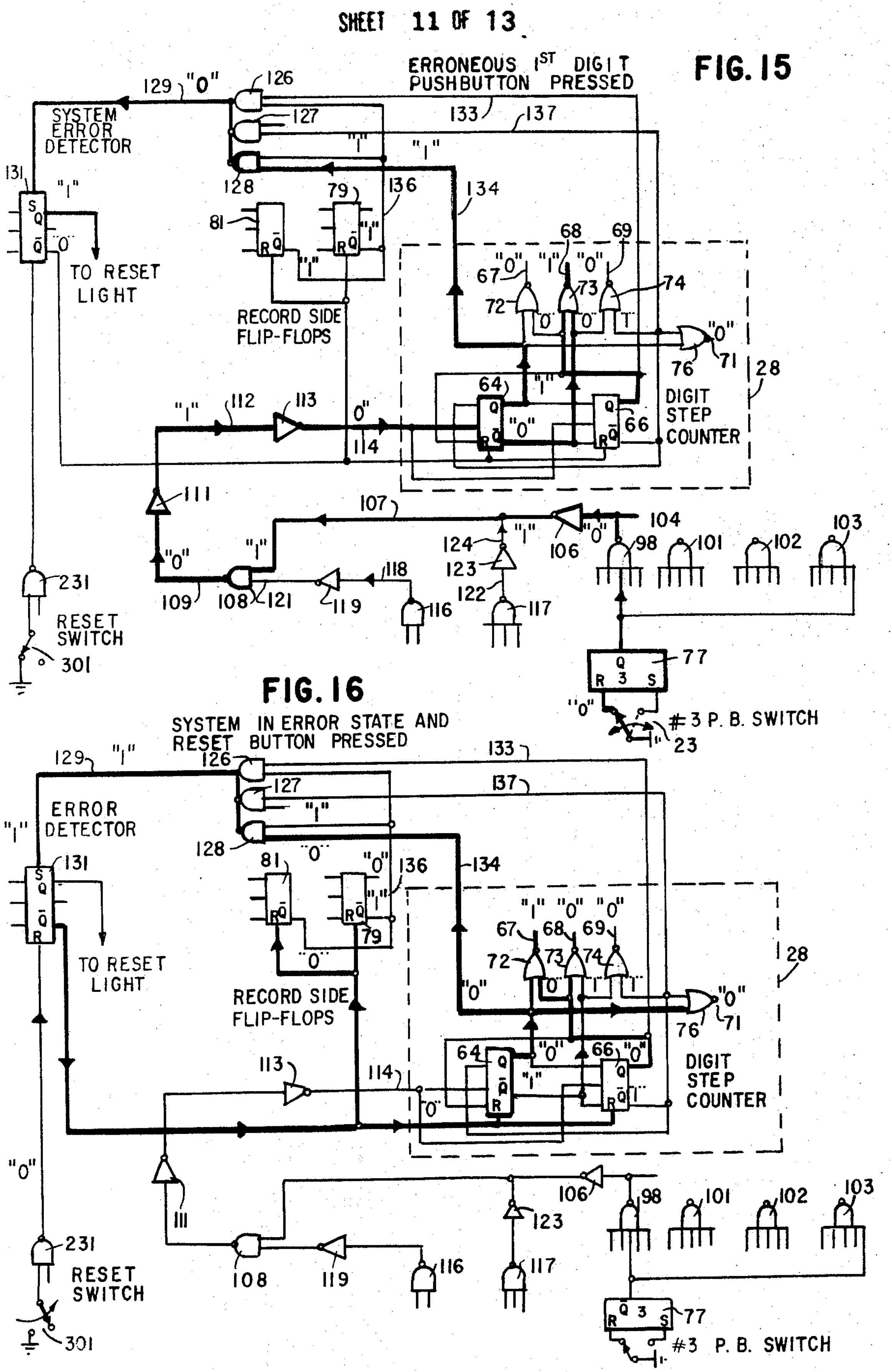

FIG. 15 illustrates the circuit conditions upon depression of an erroneous first digit pushbutton. As noted earlier, only the first digit pushbutton corresponding to numerals 1 and 2 are operable to activate the record side flip-flops 79 and 81. When an incorrect first digit pushbutton such as the pushbutton corresponding to numeral 3 is depressed, neither of the record side flip-flops 79 or 81 are triggered; failure of one of these flip-flops to trigger serves to actuate the system error detector to disable the electronic selector system.

As shown in FIG. 15, actuation of the pushbutton operated switch 23 corresponding to the numeral 3 is ineffective to trigger either one of the record side flip-flops 79 or 81, their trigger terminals being in circuit only with the switches corresponding to numerals 1 or 2 by means of leads 83 and 84 respectively. Upon release of the pushbutton switch corresponding to numeral 3, the 1 condition on the first output 67 of the digit step counter 28 transfers to the second output thereof on line 68. When this occurs, a 1 state on line 134 is applied to one input of NAND gate 128 of the system error detector 29. However, since the other input of NAND gate 128 is connected to the $\bar{Q}$ outputs of record side flip-flops 79 and 81 now remaining in a 1 condition, line 129 assumes a 0 state which is applied to the set terminal of flip-flop 131 of the system error detector 29, thereby providing a 1 signal to circuitry operable to energize a reset light (not shown), indicating to the operator that an erroneous selection has been made and that the system must be reset prior to reinitiation of the record selection. The $\overline{Q}$ output of flip-flop 131, which is now at a 0 condition, is applied to the reset terminals of flip-flops 64 and 66 of the digit step counter 28 in order to reset the step counter into its original standby state in a manner similar to that described earlier. The output of NAND gate 231 is connected to the reset terminals of flip-flop 131, one input of NAND gate 231 being normally grounded by reset switch 301.

System in Error State and Reset Button Pressed

FIG. 16 illustrates the circuit conditions following erroneous operation of the first digit pushbutton. The electronic selector system is now clamped in an error state and must be reset prior to reinitiation of the record selection.

As previously indicated, the $\overline{Q}$ output of flip-flop 131 is applied to the reset terminals of flip-flops 64 and 66 of the digit step counter 28 and to the reset terminals of record side flip-flops 79 and 81, the digit step counter thereby being reset into its original standby state with the 1 state on the second output 68 being transferred to the first output 67. The 0 condition at the Q output of flip-flop 64 is applied to one input of NAND gate 128 by means of line 134, with the result that line 129 now assumes a 1 state which locks up flip-flop 131 is an error condition. The record side flip-flops 79 and 81 are also maintained in an error condition, with the result that no pushbutton operations will now be accepted until the error condition is cleared. It is seen that the error detector 29 is operable to disable the selector system by preventing further operation of the digit step counter 28.

Pressing a reset button which actuates the reset switch 301 changes the output of NAND gate 231 to a 0 state which serves to reset the entire selector system to its standby condition by means of reset lines connected to flip-flop reset terminals, only the reset line for flip-flop 131 being shown for purpose of simplification. When the system is reset, flip-flop 131 serves to actuate circuitry to deenergize the reset light (not shown). The system is now ready to accept the correct first digit number.

Additional Credit Removal 93 REMOVAL

Figure 17:
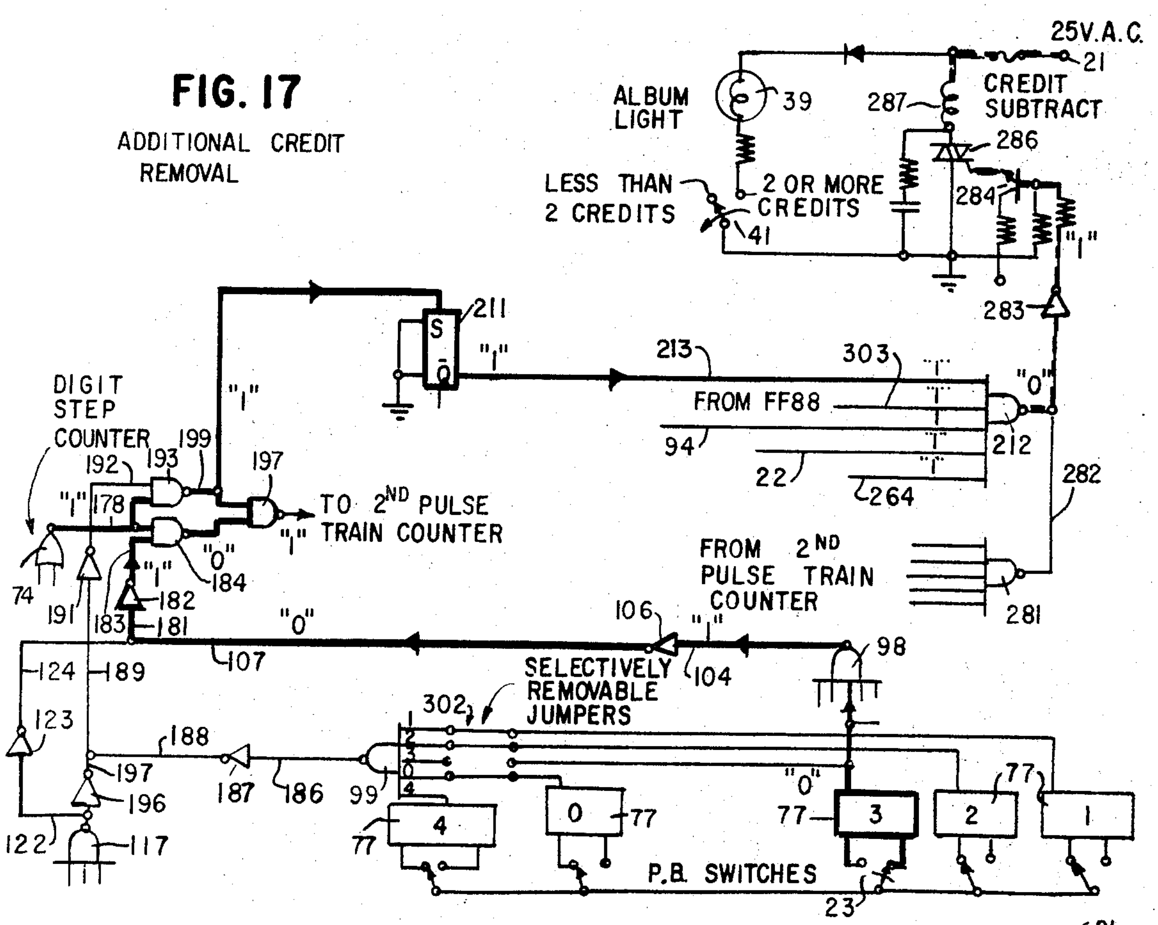

FIG. 17 illustrates the removal of an additional credit when an album selection has been played, an album selection corresponding to two credits, a single selection corresponding to only one credit, as noted earlier. With additional reference to FIG. 13V, it will be seen that the electronic selector system comprises extra credit subtract means operable to provide a signal pulse to the credit subtract coil 287 representing extra credit removal during the time interval between transmission of the first and second pulse trains, only for operation of third digit pushbuttons corresponding to predetermined record album selections.

As illustrated earlier in FIG. 9, depression of a third digit pushbutton for a single record selection actuates the album credit subtract flip-flop 211 to provide at its $\overline{Q}$ output a 0 state which is applied to one input of NAND gate 212 by means of line 213. It will be seen that removal of any one of the selectively removable jumpers 302 connecting flip-flops 77 having inputs to NAND gate 99 and corresponding to predetermined switches will serve to provide upon operation thereof a 1 condition at the output of flip-flop 211 which will operate NAND gate 212 to provide a pulse signal to the credit subtract coil 287 representative of an additional credit subtraction. The extra credit removal pulse will appear prior to the credit removal pulse produced at the output of NAND gate 281 (FIG. 13T) upon completion of the second pulse train transmission.

As shown in FIG. 17, removal of the selectively removable jumper 302 corresponding to the third digit pushbutton corresponding to the numeral 3 for certain album selections will result in no change at the output of NAND gate 99 upon depression thereof, opposite to the result illustrated in FIG. 9. The 0 state on line 186 serves to maintain a 1 condition on line 199 which does not change the $\overline{Q}$ output of flip-flop 211 from its 1 condition. NAND gate 212 has inputs comprising line 213, the $\overline{Q}$ output of flip-flop 88 of the first pulse train counter by means of lead 303, line 94, the output of the pulse generator on line 22 and line 264. With additional reference to FIG. 13V, it is seen that all of the inputs to NAND gate 212 assume a 1 state for a 50 millisecond duration occurring during the time interval between the transmission of the first and second pulse trains. The corresponding 0 output of NAND gate 212 operates the credit subtract coil 287 which transfers the credit switch 41 to a position representing less than two credits, thereby turning off the album light 39, all in a manner identical to that described earlier. Another credit subtraction occurs at the end of the second pulse train transmission by operation of NAND gate 281, as described earlier.

A working embodiment of the present invention provides a solid connection between flip-flop 77 corresponding to the numeral 4 and one input of NAND gate 99 to actuate extra credit removal when any record selection is made having a third digit corresponding to the numeral 4. The inputs to NAND gate 212 may be suitably varied to produce additional credit subtract pulses if desired.

Album Selection with Insufficient Credits

Figure 18:
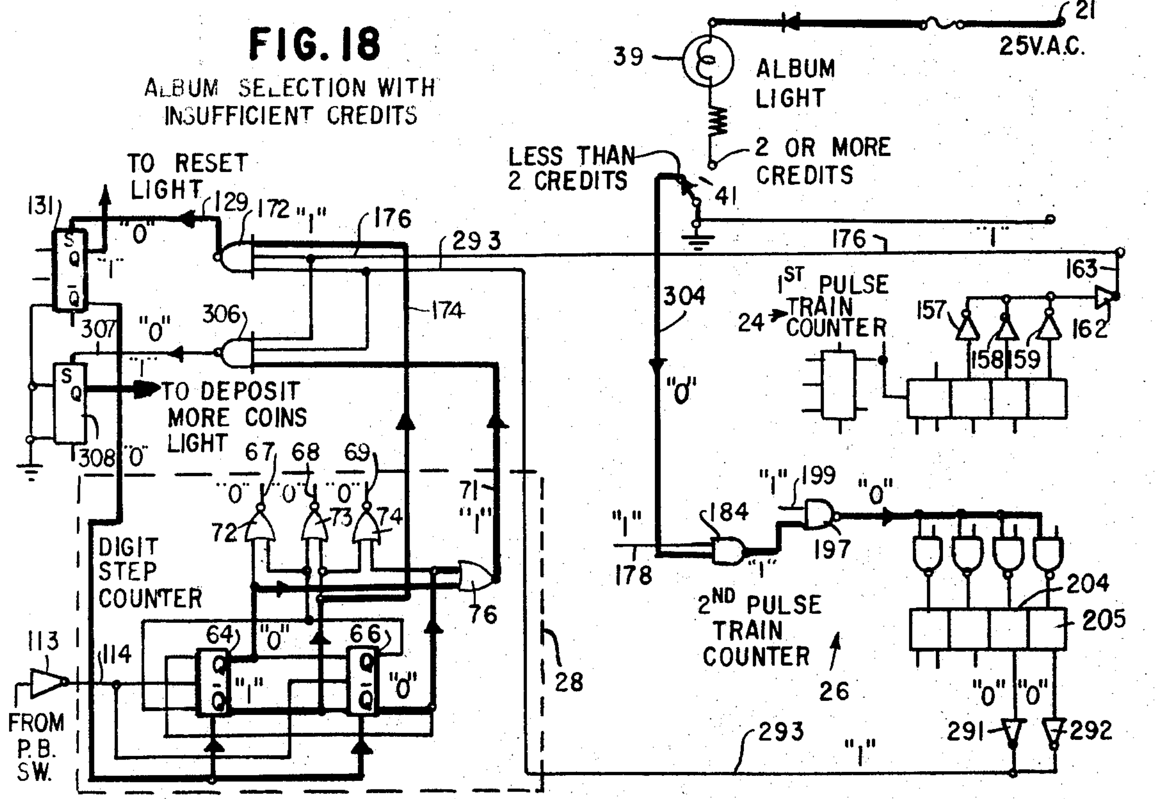

FIG. 18 illustrates the circuit conditions occurring when an album selection is made with insufficient credits stored in the accumulator. As shown therein, the album credit switch 41 having a grounded arm is connected to one input of NAND gate 184 by means of lead 304 in order to maintain thereon a 0 condition when the album credit switch is in the position corresponding to less than two credits. With additional reference to FIG. 17, depression of a third digit pushbutton corresponding to an album selection provides a 1 condition on line 199 comprising one input to NAND gate 197 having another input thereof comprising the output of NAND gate 184. Since both inputs to NAND gate 197 are at a 1 state, the output of NAND gate 197 is at a 0 condition which prevents presetting the second pulse train counter 26 in response to operation of the third digit pushbutton. However, in a manner similar to that described earlier, the 1 condition on the third output 69 of the digit step counter 28 is subsequently transferred to the fourth output 71 thereof.

The system error detector 29 comprises NAND gate 172 having one input thereof connected to the $\overline{Q}$ output of flip-flop 64 by means of line 174, another input connected to line 163 at the first pulse train counter 24 by means of lead 176 and a third input connected to a second pulse train counter by means of line 293. The system error detector 29 further comprises a NAND gate 306 having inputs comprising lines 176, 293 and the fourth output 71 of the digit step counter 28. The output of NAND gate 306 is connected by means of a line 307 to a flip-flop 308 having a Q output thereof connected to circuitry for energizing a light (not shown) indicating that additional coin deposit is required.

Upon erroneous operation of a third digit pushbutton for a selection requiring more than the stored number of credits, line 293 will remain in a 1 condition as neither one of the flip-flops 204 and 205 are preset to a 1 state (which otherwise would have occurred due to the input connections to NAND gates 98 and 103). Since all of the inputs to both NAND gates 172 and 306 are now at a 1 condition, their respective outputs will trigger flip-flops 131 and 308. The Q output of flip-flop 131 actuates circuitry to energize the reset light (not shown), while its $\overline{Q}$ output locks up the digit step counter 28 in an error condition, thereby disabling the selector system by preventing further operation of the digit step counter. The Q output of flip-flop 308, now at a 1 condition, actuates circuitry to energize a light indicating that additional coin deposit is required. It should be noted that adding more coins will be ineffective to reset the system until the reset button is pressed to clear the disabled condition, in a manner similar to that described earlier. It is seen that the selector system comprises gating means in circuit with the system error detector 29, the credit switch 41 providing a signal to said gating means representative of the amount of stored credit, said gating means being operable to actuate the error detector 29 to disable the selector system upon operational sequencing of the pushbuttons corresponding to a record selection requiring more than the stored amount of credit.

Two or More Pushbuttons Pressed or Incorrect Third Digit Selected

Figure 19:
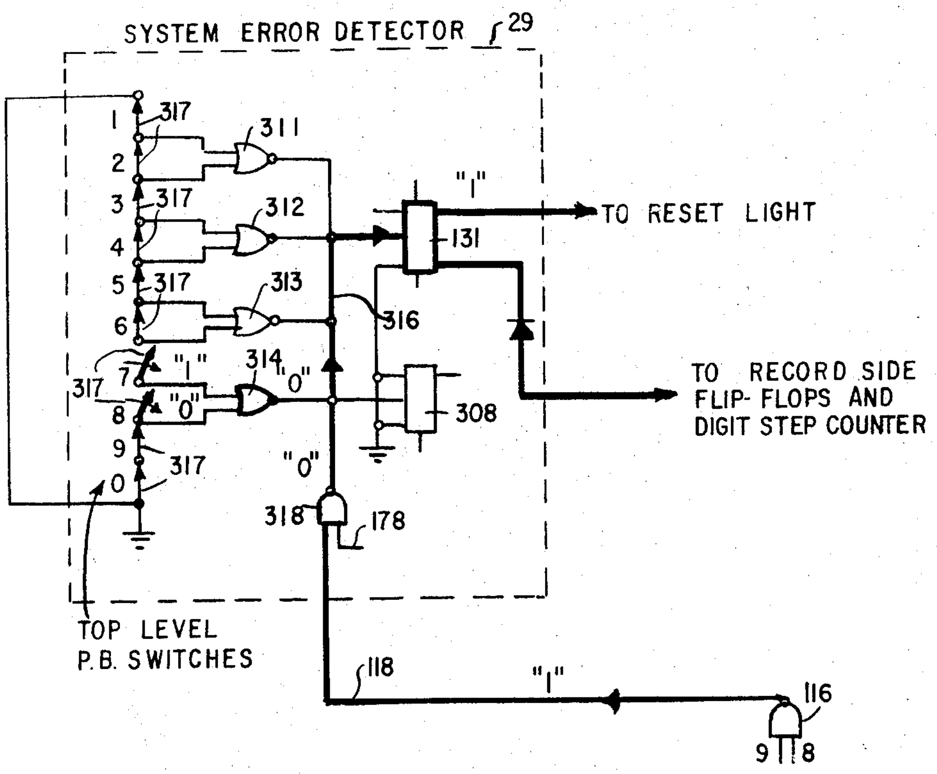

FIG. 19 illustrates the operation of the system error detector 29 when two or more pushbuttons are simultaneously pressed or an incorrect third digit is selected. As shown therein, the error detector 29 comprises NOR gates 311, 312, 313 and 314 having outputs thereof connected to a line 316 connected to the clock or trigger terminals of flip-flops 131 and 308. An additional level of switches 317 is provided in circuit with NOR gates 311, 312, 313 and 314, each of these switches being actuated by numerically corresponding pushbuttons simultaneously with the operation of the switches 23. The error detector 29 further comprises a NAND gate 318 having an output thereof connected to lead 316 and having inputs thereof comprising line 118 connected to the output of NAND gate 116 and line 178 connected to the third output 69 of the digit step counter 28. NAND gate 116 has inputs in circuit with the pushbutton actuated switches 23 corresponding to the numerals 8 and 9 which, in the preferred embodiment, are invalid as third digit numbers. It should be noted that additional NAND gates similar to NAND gate 316 could also be provided for additional invalid third digit numbers.

The operation of the system error detector 29 is illustrated for simultaneous operation of the pushbuttons corresponding to the numerals 7 and 8. The switches 317 are serially connected whereby simultaneous depression of two or more serves to provide at the output of at least one of the NOR gates 311, 312, 313 or 314 a 0 condition which, when applied to flip-flop 131, causes the reset light (not shown) to be energized and disables the selector system until cleared by depression of the reset button, in a manner similar to that described earlier. Simultaneous depression of the pushbuttons corresponding to numerals 7 and 8 provides to the inputs of NOR gate 314 1 and 0 conditions, thereby resulting in a 0 condition on line 316 which triggers the flip-flop 131.

Prior to depression of a third digit pushbutton, the third output 69 of the digit step counter 28, which is connected by means of line 178 to NAND gate 318, is at a 1 condition. Pressing a third digit pushbutton corresponding to the numerals 8 or 9 provides inputs to NAND gate 116 having unlike conditions, with the result that its output on line 118 assumes a 1 state. The result is that the output of NAND gate 318 assumes a 0 condition, which similarly actuates flip-flop 131 to disable the selector system and energize the reset light.

It is thought that the invention and many of its attendant advantages will be understood from the foregoing description, and it is apparent that various changes may be made in the form, construction and arrangement of its component parts without departing from the spirit and scope of the invention or sacrificing all of its material advantages, the form described being merely a preferred embodiment thereof.

I claim:

1. An electronic selector system operable to transmit multi-train pulse signals representative of record selections to an automatic phonograph, comprising: a pulse generator in circuit with a voltage source and operable to produce a continuous series of electrical pulses at a predetermined frequency, a plurality of selectively operable pushbuttons for actuating corresponding switches, first and second electronic pulse train counters in circuit with each other, each being operable when connected to said pulse generator to count to a common output a train of a preset number of pulses; circuit means connecting said switches with said first and second counters for individually presetting same to respectively count first and second pulse trains comprising first and second numbers of pulses, said first number being in coded correspondence with operation of first and second of said pushbuttons, said second number being in coded correspondence with operation of a third one of said pushbuttons; and a step counter in circuit with means for actuating same in response to successive pushbutton operations, said step counter being initially operable to sequentially connect said circuit means to said first and second counters for presetting same, said step counter being subsequently operable to connect said pulse generator to said first and second counters to sequentially count to said output said first and second pulse trains; whereby record selections represented by individually identifiable multi-train pulse signals are each preconditioned upon predetermined operational sequencing of three of said pushbuttons.

2. The invention of claim 1 wherein each of said pushbuttons is identified by a numerical digit, and said circuit means is operable to preset said first and second counters in response to operating said pushbuttons according to predetermined combinations of three digits each identifying a specific record selection.

3. The invention of claim 1 and a counter advance network, said digit step counter having four sequentially energized outputs thereof, said first and second outputs being respectively in circuit with first and second gating means both being connected to said first pulse train counter and said circuit means, said third output being in circuit with a third gating means connected to said second pulse train counter and said circuit means, said fourth output being in circuit with a fourth gating means connected to said pulse generator, said first output being energized when said electronic selector system is initially energized, said second and third outputs being respectively energized upon release of said first and second pushbuttons, said counter advance network being operable to energize said fourth output after said third pushbutton is pressed, energization of said first and second outputs serving to actuate said first and second gating means to enable said circuit means to preset said first counter, energization of said third output serving to actuate said third gating means to enable said circuit means to preset said second counter, and energization of said fourth output serving to actuate said fourth gating means to enable said pulse generator to provide pulses to said counters.

4. The invention of claim 1 and system error detecting means in circuit with said switches, said first and second counters, said circuit means and said step counter; said error detecting means being operable upon erroneous operation of any of said pushbuttons to disable the selector system by preventing further operation of said step counter.

5. The invention of claim 4 wherein said error detecting means comprises plural flip-flop circuits.

6. The invention of claim 4 and reset means to reinitiate operation of the selector system.

7. The invention of claim 4 wherein said error detecting means comprises gating means and a plurality of switches in circuit therewith, said switches being correspondingly actuated by said pushbuttons, simultaneous actuation of at least two of said switches serving to operate said gating means to actuate said error detecting means to disable the selector system.

8. The invention of claim 4 wherein said circuit means includes two record side flip-flops in circuit with said error detecting means, a first operation of said pushbuttons corresponding only to either of two predetermined switches serving to trigger one of said flip-flops, a first operation of said pushbuttons corresponding to any other of said switches being inoperable to trigger one of said flip-flops, failure of one of said flip-flops to trigger upon a said first operation serving to actuate said error detecting means to disable the selector system.

9. The invention of claim 4 and gating means in circuit with said error detecting means and certain of said switches, operation of a third of said pushbuttons corresponding to any one of said certain switches serving to operate said gating means to actuate said error detecting means to disable the selector system.

10. The invention of claim 4, a credit switch, and gating means in circuit with said error detecting means; said credit swtich providing a signal to said gating means representative of the amount of stored credit, said gating means being operable to actuate said error detecting means to disable the selector system upon operational sequencing of said pushbuttons corresponding to a record selection requiring more than said stored amount of credit.

11. The invention of claim 1 and credit subtract means in circuit with said pulse generator and said second pulse train counter, said credit subtract means being operable upon completion of said second pulse train to provide a signal pulse representing credit removal.

12. The invention of claim 1 and gating means in circuit with said first and second counters, said gating means being operable to initiate said second train after a predetermined time interval following termination of said first train, said time interval being greater than the time between successive pulses in each of said trains.

13. The invention of claim 12 and extra credit subtract means in circuit with said pulse generator and certain of said switches, operation of a third one of said pushbuttons corresponding to any one of said certain switches serving to actuate said extra credit subtract means to provide during said time interval a signal pulse representing extra credit removal.

14. The invention of claim 1 wherein the selector system comprises a wall box unit operable to transmit multi-train pulse signals for controlling an automatic phonograph at a remote location.

15. The invention of claim 1 wherein each of said first and second counters comprises a binary ripple counter having a plurality of bistable flip-flop devices.

16. The invention of claim 15 wherein said devices comprise integrated circuits.

17. An electronic selector system operable to transmit multi-train pulse signals representative of record selections to an automatic phonograph, comprising: a pulse generator in circuit with a voltage source and operable to produce a continuous series of electrical pulses at a predetermined frequency, a plurality of selectively operable pushbuttons for actuating corresponding switches, plural electronic pulse train counting means, each being operable when connected to said pulse generator to count to a common output a train of a preset number of pulses; circuit means connecting said switches with each said counting means for individually presetting same to count a pulse train comprising a coded number of pulses corresponding to operation of one of said pushbuttons; and a step counter in circuit with means for actuating same in response to successive pushbutton operations, said step counter being initially operable to sequentially connect said circuit means to each said counting means for presetting same, said step counter being subsequently operable to connect said pulse generator to said counting means to sequentially count to said output each said pulse train; whereby record selections represented by individually identifiable multi-train pulse signals are each preconditioned upon predetermined operational sequencing of said pushbuttons.

18. The invention of claim 17 wherein each of said pushbuttons is identified by a numerical digit, and said circuit means is operable to preset said counting means in response to operating said pushbuttons according to predetermined digital combinations each identifying a specific record selection.

19. The invention of claim 17 and system error detecting means in circuit with said switches, said counting means, said circuit means and said step counter; said error detecting means being operable upon erroneous operation of any of said pushbuttons to disable the selector system by preventing further operation of said step counter.

20. The invention of claim 19 and reset means to reinitiate operation of the selector system.

* * * * *